(12) United States Patent
Tuji et al.

(10) Patent No.: US 8,368,209 B2
(45) Date of Patent: Feb. 5, 2013

(54) SEMICONDUCTOR DEVICE

(75) Inventors: Takahiro Tuji, Kanagawa (JP); Koichiro Kamata, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 323 days.

(21) Appl. No.: 12/883,378

(22) Filed: Sep. 16, 2010

(65) Prior Publication Data

US 2011/0063803 A1 Mar. 17, 2011

(30) Foreign Application Priority Data

Sep. 17, 2009 (JP) ................. 2009-215537

(51) Int. Cl.
 *H01L 23/34* (2006.01)
(52) U.S. Cl. ....................... 257/724; 257/723
(58) Field of Classification Search .............. 257/723, 257/724, 679, 787, 659
 See application file for complete search history.

(56) References Cited

U.S. PATENT DOCUMENTS

| | | | | | |
|---|---|---|---|---|---|
| 3,335,328 | A | * | 8/1967 | Brackett ...................... | 361/806 |
| 3,434,204 | A | * | 3/1969 | Grabbe ......................... | 438/107 |
| 3,784,725 | A | * | 1/1974 | Perkins et al. ............... | 361/728 |
| 5,461,545 | A | * | 10/1995 | Leroy et al. ................... | 361/765 |
| 5,864,088 | A | * | 1/1999 | Sato et al. ...................... | 174/386 |
| 5,986,341 | A | * | 11/1999 | Usami et al. .................. | 257/723 |
| 8,076,757 | B2 | * | 12/2011 | Pagaila et al. ................. | 257/659 |
| 8,148,818 | B2 | * | 4/2012 | Yamazaki et al. ............ | 257/729 |
| 2006/0267771 | A1 | | 11/2006 | Shionoiri et al. | |
| 2009/0085182 | A1 | | 4/2009 | Yamazaki et al. | |
| 2009/0289341 | A1 | | 11/2009 | Yamazaki et al. | |
| 2009/0305467 | A1 | | 12/2009 | Goto et al. | |
| 2010/0065952 | A1 | | 3/2010 | Oikawa et al. | |
| 2010/0072548 | A1 | | 3/2010 | Eguchi et al. | |
| 2010/0072583 | A1 | | 3/2010 | Oikawa et al. | |
| 2010/0072611 | A1 | | 3/2010 | Oikawa et al. | |
| 2010/0078787 | A1 | | 4/2010 | Yakubo | |
| 2012/0119339 | A1 | * | 5/2012 | Oikawa et al. ................ | 257/659 |

FOREIGN PATENT DOCUMENTS

JP     2007-5778     1/2007

* cited by examiner

*Primary Examiner* — S. V Clark
(74) *Attorney, Agent, or Firm* — Husch Blackwell LLP

(57) ABSTRACT

The problem of damage on an antenna or a circuit (electrostatic breakdown) due to discharge of electric charge accumulated in an insulator is solved; and the problem of NAKANUKE failure is solved. A pair of conductive layers, a pair of insulators provided between the pair of conductive layers, and a chip which is provided between the pair of insulators and includes an antenna, an analog circuit, and a digital circuit are provided, in which an opening is provided for at least one of the pair of conductive layers, and the opening is provided at a position which overlaps at least the analog circuit.

12 Claims, 26 Drawing Sheets

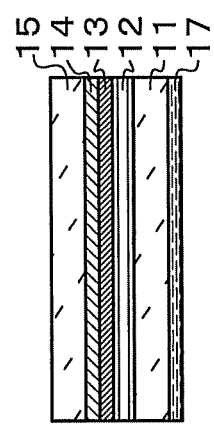
FIG. 25A
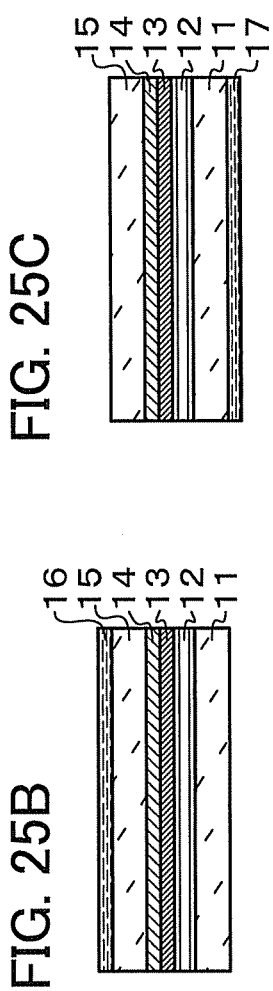
FIG. 25B
FIG. 25C
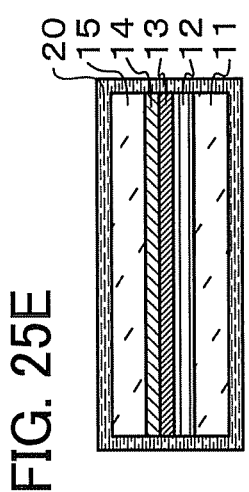
FIG. 25D
FIG. 25E
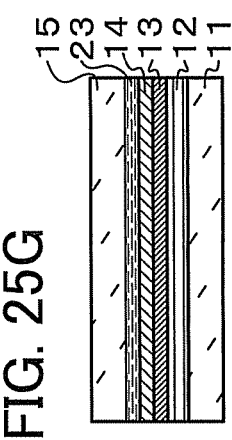
FIG. 25G
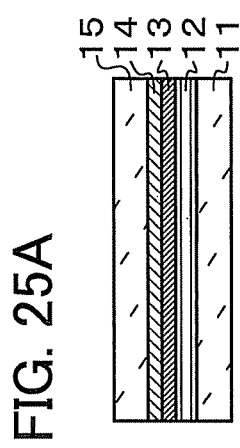
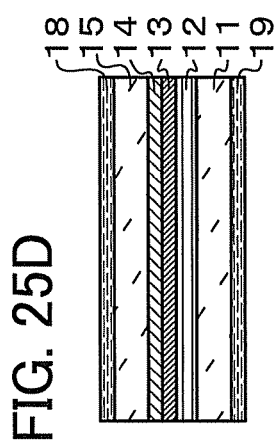
FIG. 25F
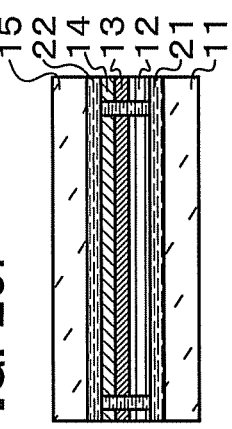

FIG. 26

| | | Difference of Structures | | | | Results of ESD Test (Average) | |
|---|---|---|---|---|---|---|---|
| | | Material | Forming Position | Contact | Thickness | Front (Antenna Side) | Rear (TFT Side) |
| Comparison Structure | FIG.25(A) | × | × | × | × | 5.2 kV | 2.7 kV |
| Structure 1 | FIG.25(B) | Ti | Front only | × | 10 nm | 5.8 kV | 2.2 kV |
| Structure 2 | FIG.25(C) | Ti | Rear only | × | 10 nm | 5.2 kV | 8.0 kV |
| | | Ti | Front, Rear | | 10 nm | 6.4 kV | 8.0 kV |
| Structure 3 | FIG.25(D) | ITO (containing SiO$_2$) | Front, Rear | × | 10 nm | 9.2 kV | 9.4 kV |
| | | Ti | Front, Rear | | 10 nm | ≥15.0 kV | ≥15.0 kV |
| Structure 4 | FIG.25(E) | ITO (containing SiO$_2$) | Front, Rear | O | 10 nm | 14.0 kV | 12.0 kV |
| | | ITO (containing SiO$_2$) | Front, Rear | | 100 nm | ≥15.0 kV | ≥15.0 kV |
| Structure 5 | FIG.25(F) | ITO (containing SiO$_2$) | Front, Rear | O | 10 nm | 11.0 kV | 12.4 kV |
| Structure 6 | FIG.25(G) | ITO (containing SiO$_2$) | Front only | × | 10 nm | 8.0 kV | 2.2 kV |

(Forming Position column notes: "Outside" applies to Structures 3–4; "Inside" applies to Structures 5–6)

SEMICONDUCTOR DEVICE

BACKGROUND OF THE INVENTION

1. Field of the Invention

The present invention relates to a semiconductor device or the like.

2. Description of the Related Art

A semiconductor device which performs wireless communication via an antenna is disclosed in Patent Document 1.

REFERENCE

Patent Document 1: Japanese Published Patent Application No. 2007-005778

SUMMARY OF THE INVENTION

In semiconductor devices which perform wireless communication via an antenna, the antenna and a circuit including a thin film transistor are surrounded by an insulator to protect the antenna and the circuit.

However, insulators are likely to accumulate electric charge.

Therefore, due to discharge of electric charge accumulated in the insulator, there has been a problem in that the antenna or the circuit is damaged (electrostatic breakdown).

In this specification, structures in which the problem of the electrostatic breakdown is solved are disclosed below.

In a semiconductor device having a structure where a chip including an antenna and a circuit is surrounded by a pair of insulators, at least one conductive layer is formed on the outer side or the inner side of the pair of insulators so that the electrostatic withstand voltage is increased, whereby occurrence of electrostatic breakdown can be suppressed.

According to the evaluation of semiconductor devices in each of which a conductive layer is provided for both of an obverse surface and a rear surface of a chip, it was found that there is a semiconductor device which does not respond (or the response rate of which is low) near an antenna of a reader/writer.

Such a defect that the semiconductor device does not respond near the antenna is referred to as NAKANUKE failure in this specification.

As a result of consideration of the inventors and the like, it was figured out that the NAKANUKE failure is caused by a conductive layer disposed at a position which overlaps an analog circuit (particularly a regulator circuit).

Therefore, in order to prevent the NAKANUKE failure, it is efficient to remove a conductive layer disposed at a position which overlaps an analog circuit on one of the obverse surface and the rear surface of the semiconductor device.

In accordance with one embodiment of the present invention, a semiconductor device including a pair of conductive layers, a pair of insulators provided between the pair of conductive layers, and a chip which is provided between the pair of insulators and includes an antenna, an analog circuit, and a digital circuit can be provided, in which an opening is provided for at least one of the pair of conductive layers, and the opening is provided at a position which overlaps at least the analog circuit.

In accordance with one embodiment of the present invention, a semiconductor device including a pair of insulators, a pair of conductive layers provided between the pair of insulators, and a chip which is provided between the pair of conductive layers and includes an antenna, an analog circuit, and a digital circuit can be provided, in which an opening is provided for at least one of the pair of conductive layers, and the opening is provided at a position which overlaps at least the analog circuit.

It is preferable that the opening be provided selectively only at a position which overlaps the analog circuit.

It is preferable that the opening be provided selectively only at a position which overlaps the analog circuit and the digital circuit.

It is preferable that the opening be provided selectively only at a position which overlaps the antenna, the analog circuit, and the digital circuit.

In accordance with one embodiment of the present invention, a semiconductor device including a pair of conductive layers, a pair of insulators provided between the pair of conductive layers, and a chip which is provided between the pair of insulators and includes an antenna, an analog circuit, and a digital circuit can be provided, in which the analog circuit includes at least a regulator circuit, an opening is provided for at least one of the pair of conductive layers, and the opening is provided at a position which overlaps at least the regulator circuit.

In accordance with one embodiment of the present invention, a semiconductor device including a pair of insulators, a pair of conductive layers provided between the pair of insulators, and a chip which is provided between the pair of conductive layers and includes an antenna, an analog circuit, and a digital circuit can be provided, in which the analog circuit includes at least a regulator circuit, an opening is provided for at least one of the pair of conductive layers, and the opening is provided at a position which overlaps at least the regulator circuit.

It is preferable that the opening be provided selectively only at a position which overlaps the regulator circuit.

It is preferable that the pair of conductive layers be electrically connected to each other.

At least one conductive layer is formed on the outer side or the inner side of the pair of insulators, whereby occurrence of electrostatic breakdown can be suppressed.

The conductive layer for preventing electrostatic breakdown is not provided at a position which overlaps the analog circuit on one of the obverse surface and the rear surface of the chip, whereby NAKANUKE failure can be prevented.

BRIEF DESCRIPTION OF THE DRAWINGS

In the accompanying drawings:

FIGS. 25A to 25G illustrate examples of a semiconductor device;
and
FIG. 26 shows measurement results (ESD test).

DETAILED DESCRIPTION OF THE INVENTION

Figure 1A:
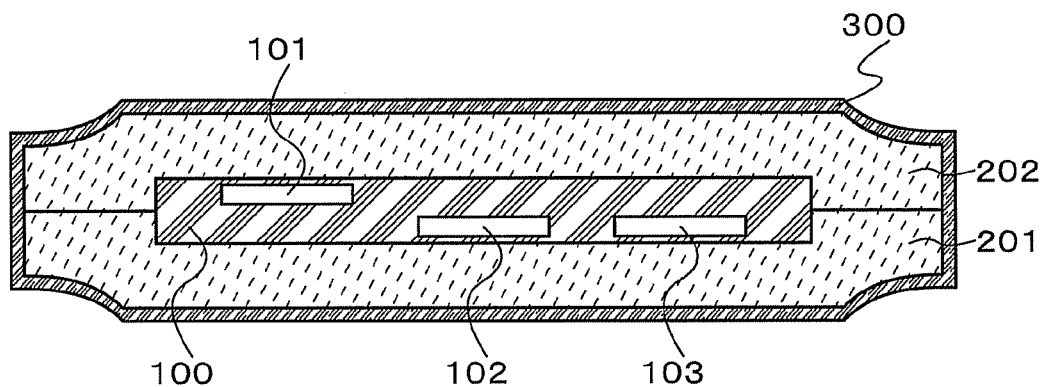
FIGS. 1A and 1B illustrate an example of a semiconductor device.

Embodiments and examples will be described in detail with reference to the drawings.

Note that it is easily understood by those skilled in the art that the present invention is not limited to the description below and various changes and modifications can be made without departing from the spirit and scope of the present invention.

Therefore, the disclosed invention should not be construed as being limited to the following description of the embodiments and examples.

In the structures of the present invention described below, the same portions or portions having similar functions are denoted by the same reference numerals throughout the drawings, and description thereof is not repeated.

Embodiment 1

Examples of a semiconductor device will be described.

Figure 1B:
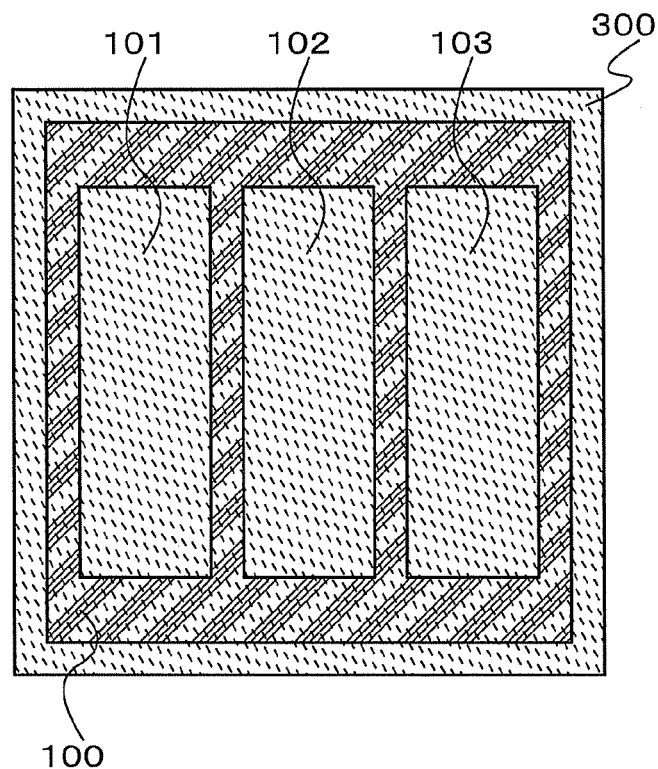

FIGS. 1A and 1B illustrate a semiconductor device including a chip 100 including an antenna 101, an analog circuit 102, and a digital circuit 103, a first insulator 201, a second insulator 202, and a conductive layer 300.

The conductive layer 300 is formed by electrically connecting a pair of conductive layers provided above and below the chip. The pair of conductive layers is not necessarily electrically connected to each other. The method for electrical connection includes, but not limited to, a method for connection in which melting is performed by laser, a method for connection in which a connection electrode is formed in a contact hole formed in the insulating layer, and the like.

In this embodiment, the chip 100 is surrounded between the first insulator 201 and the second insulator 202.

In FIGS. 1A and 1B, the antenna 101 is provided over the analog circuit 102 and the digital circuit 103 with an insulating film interposed therebetween.

The antenna 101, the analog circuit 102, and the digital circuit 103 may be provided over the same insulating surface.

Alternatively, the antenna 101 may be provided below the analog circuit 102 and the digital circuit 103 with an insulating film interposed therebetween.

The conductive layer 300 surrounds the first insulator 201 and the second insulator 202.

FIG. 1A is a cross-sectional view and FIG. 1B is a plan view.

By providing the conductive layer 300 as shown in FIGS. 1A and 1B, accumulation of static electricity in the first insulator 201 and the second insulator 202 is suppressed, so that electrostatic breakdown can be prevented.

Figure 2A:
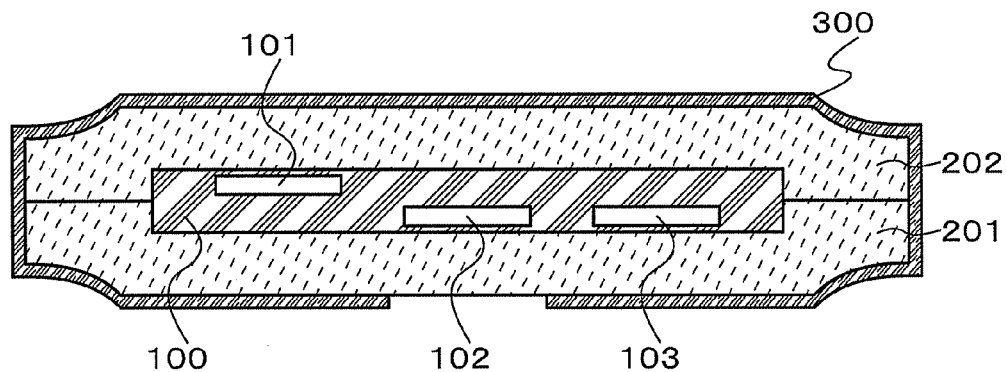
FIGS. 2A and 2B illustrate an example of a semiconductor device.
Figure 2B:
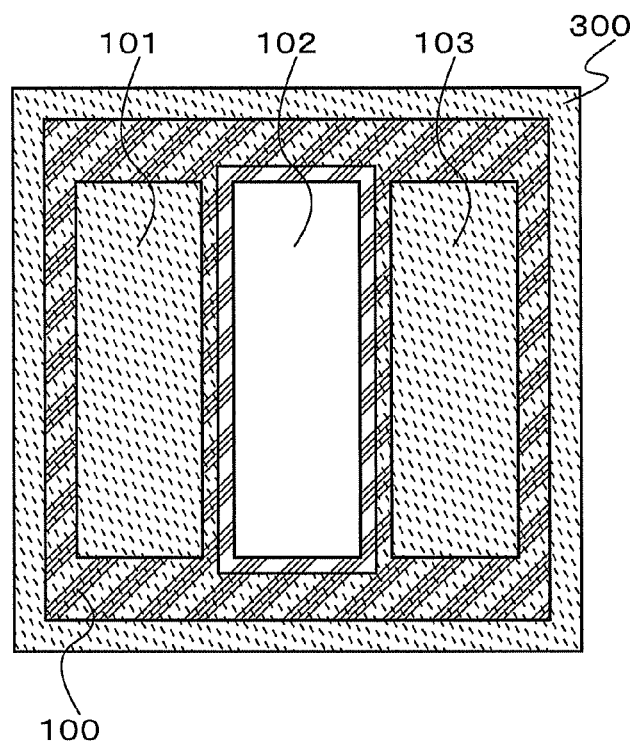

FIGS. 2A and 2B illustrate a semiconductor device in which an opening is provided in the conductive layer on the circuit side in FIGS. 1A and 1B.

The opening is selectively provided at a region which overlaps the analog circuit 102.

That is, the opening is provided at the region which overlaps the analog circuit 102 and the conductive layer 300 is provided at a region which overlaps the antenna 101 and at a region which overlaps the digital circuit 103.

In accordance with FIGS. 2A and 2B, occurrence of NAKANUKE failure can be prevented.

FIG. 2A is a cross-sectional view and FIG. 2B is a plan view.

Figure 3:
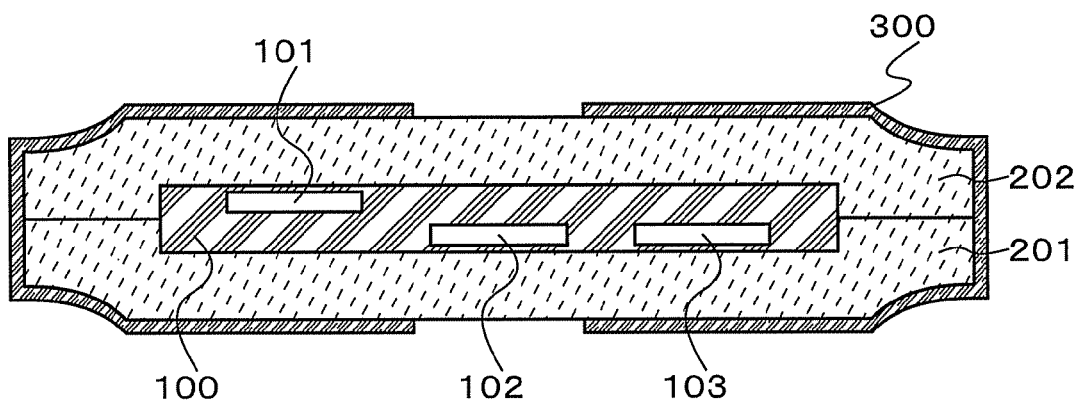
FIG. 3 illustrates an example of a semiconductor device.

Although the opening is provided only in the conductive layer on the circuit side in FIGS. 2A and 2B, an opening may be provided in the conductive layer also on the antenna side as shown in FIG. 3.

Figure 4A:
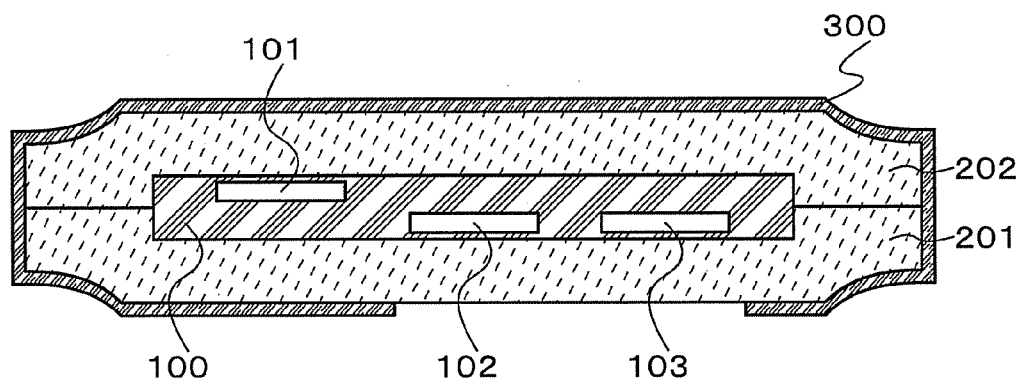
FIGS. 4A and 4B illustrate an example of a semiconductor device.
Figure 4B:
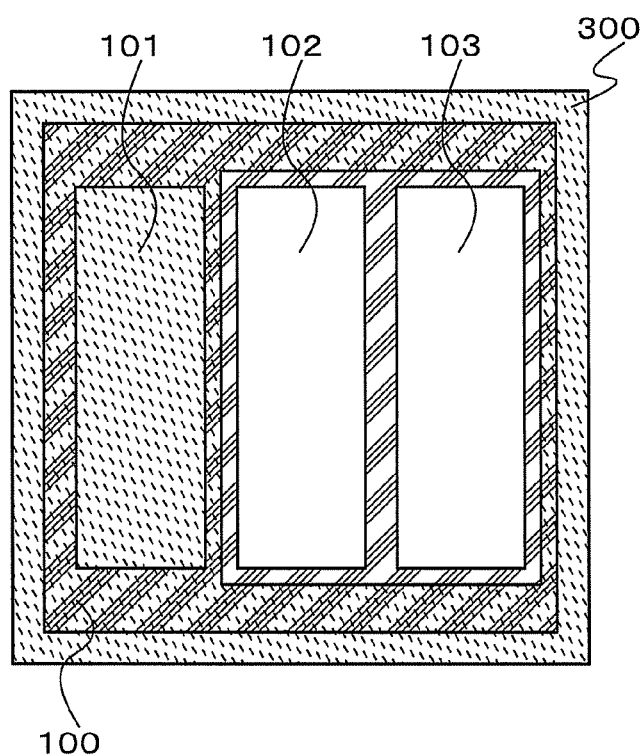

An opening may be selectively provided in the conductive layer at a position which overlaps the analog circuit 102 and the digital circuit 103 as shown in FIGS. 4A and 4B.

That is, the opening is provided at the region which overlaps the analog circuit 102 and the digital circuit 103 and the conductive layer 300 is provided at a region which overlaps the antenna 101.

The opening may be provided either one or both of the circuit side and the antenna side.

FIG. 4A is a cross-sectional view and FIG. 4B is a plan view.

Figure 5A:
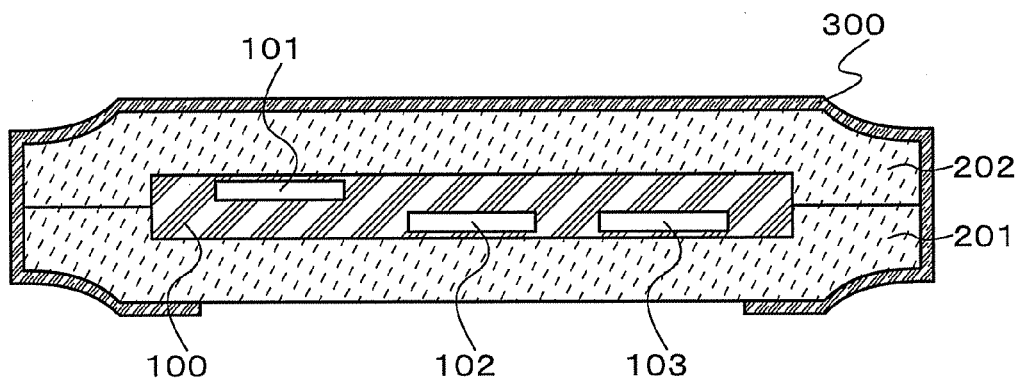
FIGS. 5A and 5B illustrate an example of a semiconductor device.
Figure 5B:
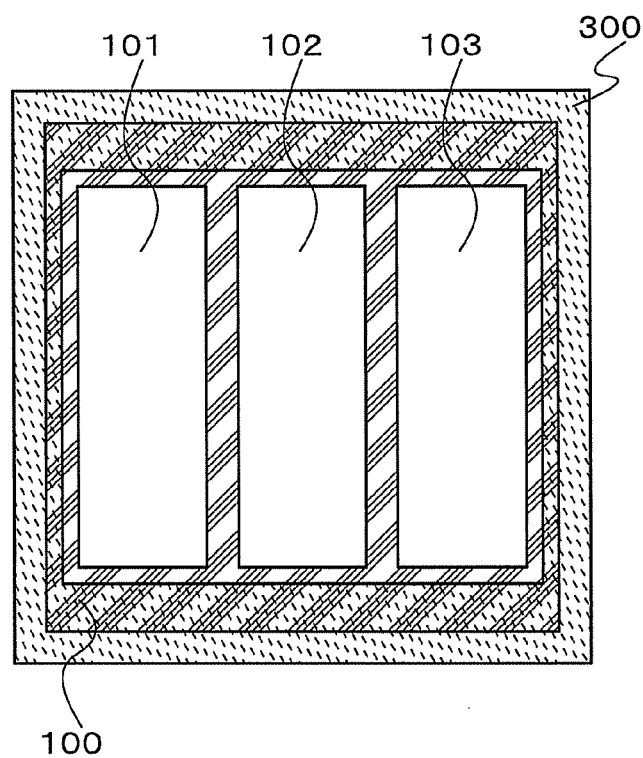

An opening may be selectively provided in the conductive layer at a position which overlaps the antenna 101, the analog circuit 102, and the digital circuit 103 as shown in FIGS. 5A and 5B.

That is, the opening is provided at a region which overlaps the antenna 101, the analog circuit 102, and the digital circuit 103 and the conductive layer 300 is provided at a peripheral portion around the antenna 101, the analog circuit 102, and the digital circuit 103.

The opening may be provided either one or both of the circuit side and the antenna side.

In this embodiment, the more electrostatic breakdown can be prevented, the larger the surface are of the conductive layer 300 becomes.

Therefore, the structure shown in FIGS. 2A and 2B is preferable because the problem of NAKANUKE failure can be prevented and the surface are of the conductive layer 300 is large.

Even in the structure shown in FIGS. 5A and 5B, electrostatic breakdown can be prevented by the conductive layer 300 left in the peripheral portion.

Further, it was found out from experimental result by the inventors of the present invention that occurrence of NAKANUKE failure can be prevented by removing a conductive layer at a region which overlaps a control portion of a regulator circuit in the analog circuit.

Therefore, in order for the conductive layer 300 to have a larger surface area, it is preferable that the conductive layer at the region which overlaps the regulator circuit in the analog circuit be removed selectively to form an opening.

Figure 13:
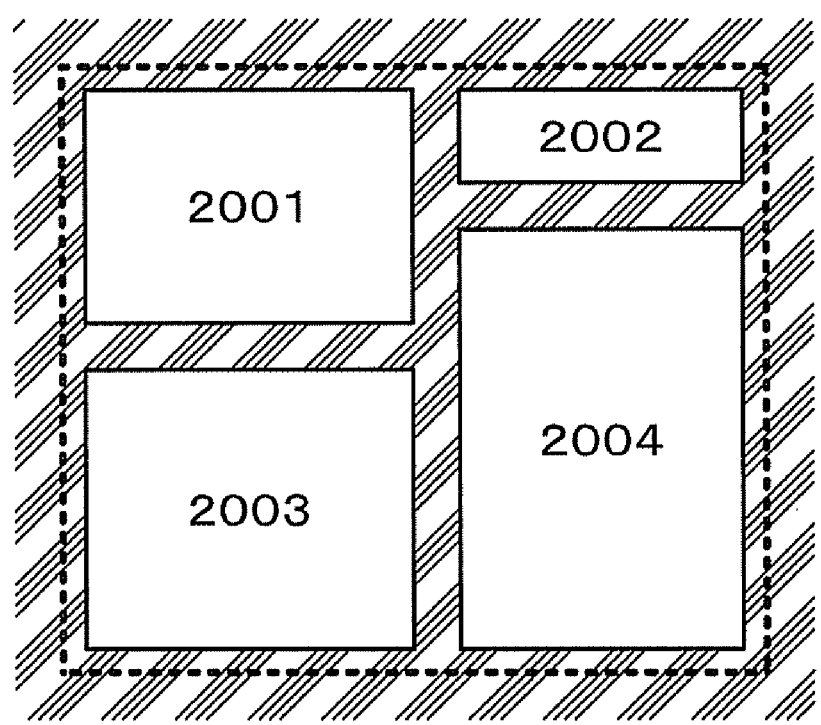
FIG. 13 illustrates an example of a regulator circuit.

For example, in the case of a regulator circuit including a region 2001 in which a capacitor is provided, a control portion 2002, a region 2003 in which a resistor is provided, and a region 2004 in which a circuit other than the control portion is provided as shown in FIG. 13, the conducive layer at a region which overlaps the regulator circuit is selectively removed.

It is far preferable that the conductive layer at a region which overlaps the control portion of the regulator circuit be selectively removed to form an opening.

Figure 22:
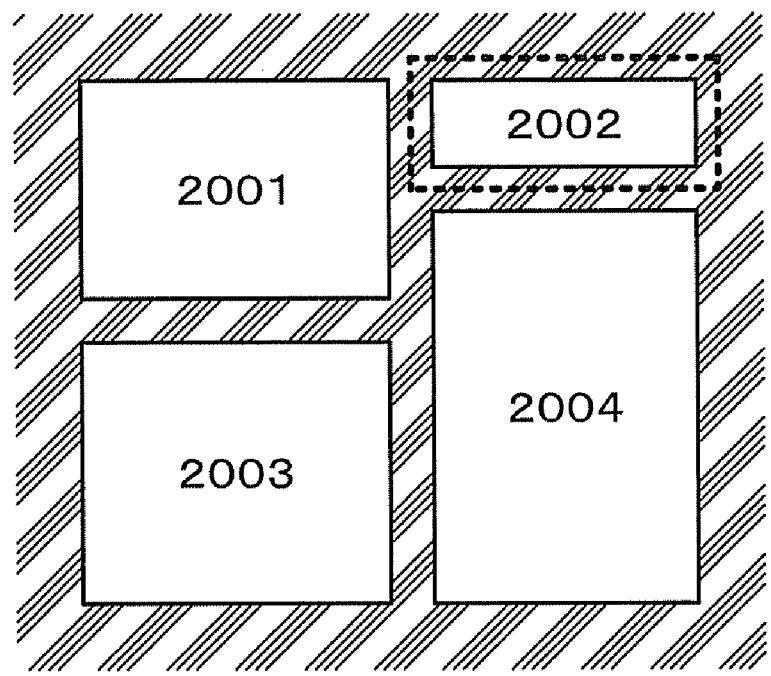
FIG. 22 illustrates an example of a regulator circuit.

For example, in the case of a regulator circuit including a region 2001 in which a capacitor is provided, a control portion 2002, a region 2003 in which a resistor is provided, and a region 2004 in which a circuit other than the control portion is provided as shown in FIG. 22, the conducive layer at a region which overlaps the control portion 2002 is selectively removed.

The conductive layer at a region which overlaps the control portion and a part of the other circuit of the regulator circuit may be selectively removed to form an opening.

Figure 19:
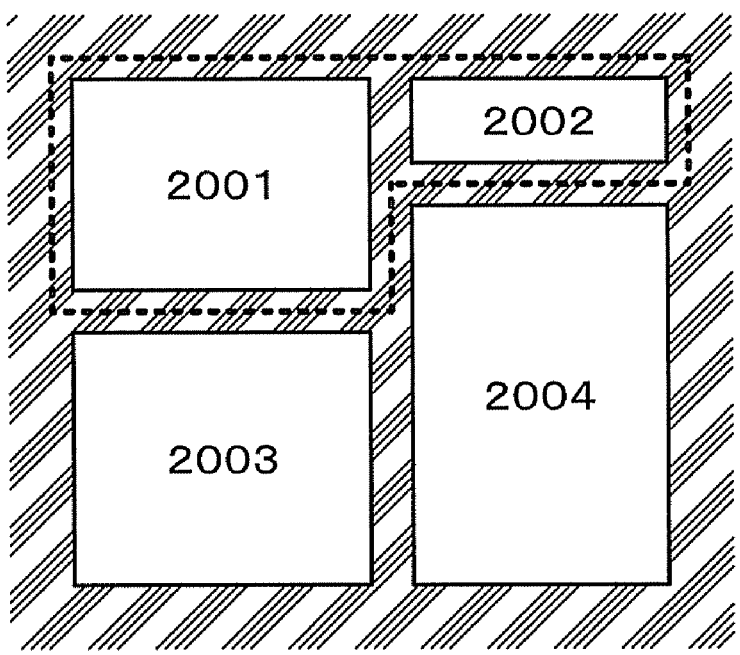
FIG. 19 illustrates an example of a regulator circuit.

For example, in the case of a regulator circuit including a region 2001 in which a capacitor is provided, a control portion 2002, a region 2003 in which a resistor is provided, and a region 2004 in which a circuit other than the control portion is provided as shown in FIG. 19, the conducive layer at a region which overlaps the region 2001 in which a capacitor is provided and the control portion 2002 is selectively removed.

This embodiment can be combined with any other embodiment.

Embodiment 2

The structure in which the conductive layer on the circuit side is electrically connected to the conductive layer on the antenna side is described in Embodiment 1.

Electrostatic breakdown can be prevented even when the conductive layer on the circuit side is not electrically connected to the conductive layer on the antenna side.

That is, the first conductive layer may be provided over the first insulator and the second conductive layer may be provided under the second insulator.

However, electrostatic breakdown can be further prevented by electrically connecting the first conductive layer to the second conductive layer.

This embodiment can be combined with any other embodiment.

Embodiment 3

Although the conductive layer is provided on the outer side of the first insulator 201 and the second insulator 202 in Embodiment 1, a conductive layer may be provided on the inner side of the first insulator 201 and the second insulator 202 to prevent electrostatic breakdown.

That is, a first conductive layer may be provided between the chip 100 and the first insulator 201 and a second conductive layer may be provided between the chip 100 and the second insulator 202.

The first conductive layer may be electrically connected or disconnected to the second conductive layer.

However, electrostatic breakdown can be further prevented by electrically connecting the first conductive layer to the second conductive layer.

This embodiment can be combined with any other embodiment.

Embodiment 4

An example of a circuit block diagram of a semiconductor device is described.

Figure 6:
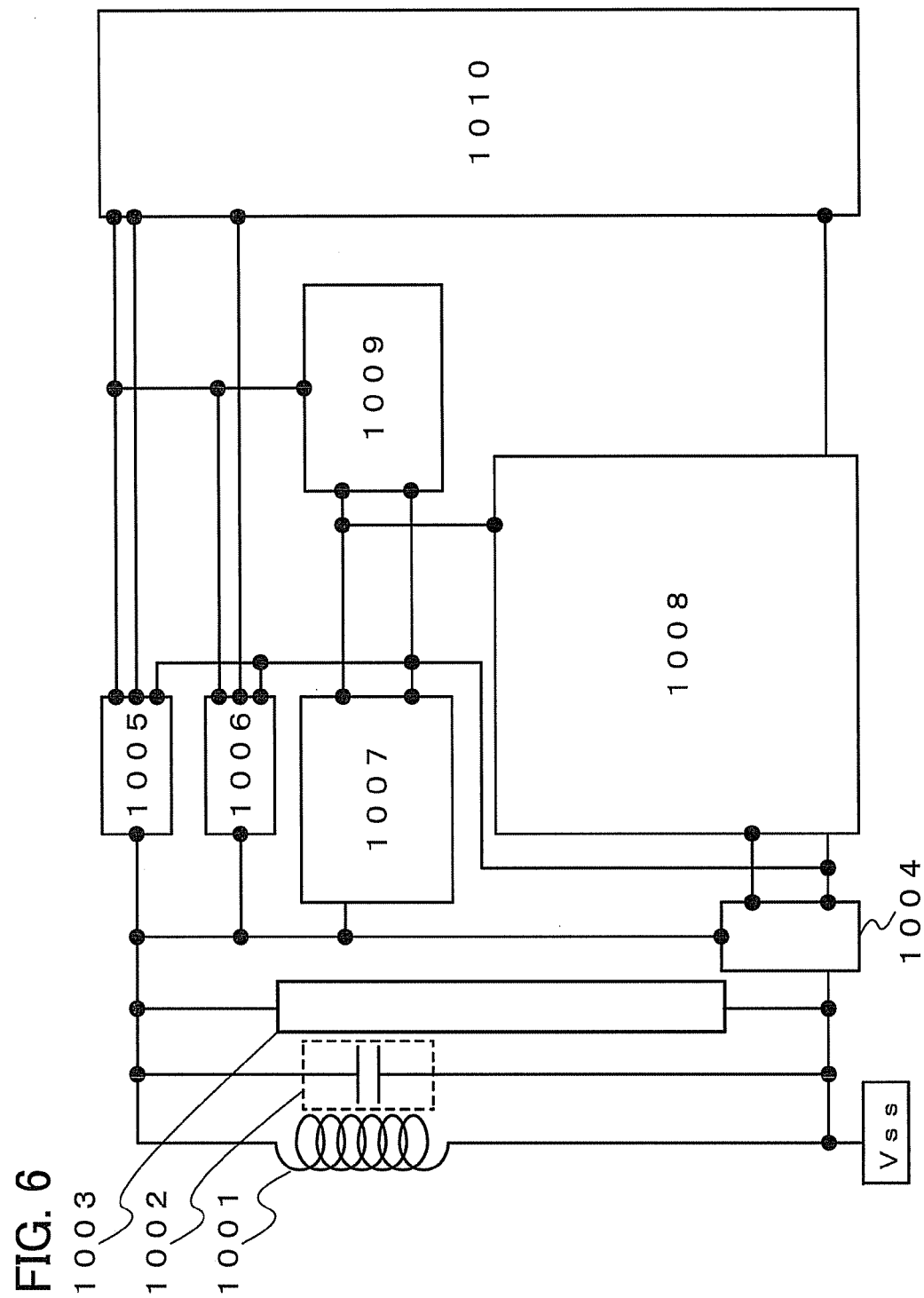
FIG. 6 illustrates an example of a semiconductor device.

A semiconductor device according to this embodiment includes an antenna 1001, a resonant capacitor 1002, a limiter circuit 1003, a switch 1004, a demodulating circuit 1005, a modulating circuit 1006, a rectifying circuit 1007, a voltage detecting circuit 1008, a regulator circuit 1009, and a logic circuit 1010 (FIG. 6).

Reference symbol Vss denotes a low power source potential or GND (ground, 0V).

The antenna 1001 receives and transmits electromagnetic waves.

The resonant capacitor 1002 is provided to adjust the resonant frequency of electromagnetic waves which are received and transmitted.

The limiter circuit 1003 is provided so that the demodulating circuit 1005, the modulating circuit 1006, the rectifying circuit 1007, or the like can be prevented from being broken by overcurrent which flows therein. The limiter circuit 1003 behaves to turn the switch 1004 on so that current from the antenna 101 flows to Vss.

The demodulating circuit 1005 performs demodulation.

The modulating circuit 1006 performs modulation.

The rectifying circuit 1007 rectifies signals transmitted from the antenna.

The voltage detecting circuit 1008 detects an output voltage of the rectifying circuit.

The regulator circuit 1009 is provided to convert an input voltage into a predetermined voltage to be output.

The logic circuit 1010 is provided to supply a signal in response to a signal from the demodulating circuit.

In this embodiment, an analog circuit includes in its category the resonant capacitor 1002, the limiter circuit 1003, the switch 1004, the demodulating circuit 1005, the modulating circuit 1006, the rectifying circuit 1007, the voltage detecting circuit 1008, the regulator circuit 1009, or the like.

A digital circuit includes in its category the logic circuit 1010 or the like.

This embodiment can be combined with any other embodiment.

Embodiment 5

An example of a regulator circuit is described.

Figure 7A:
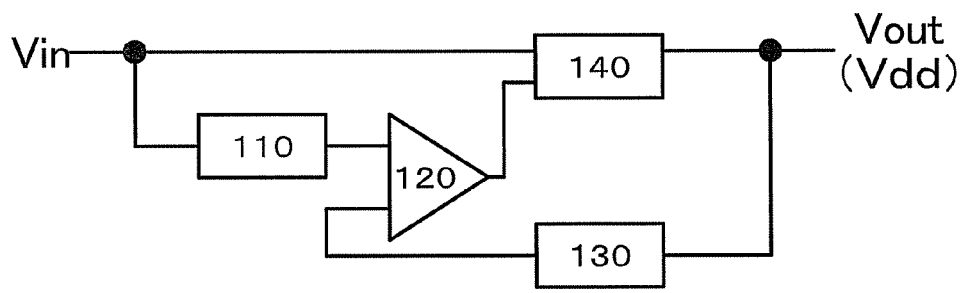
FIGS. 7A to 7C each illustrate an example of a regulator circuit.

FIG. 7A is an example of a block diagram of a regulator circuit.

Figure 7B:
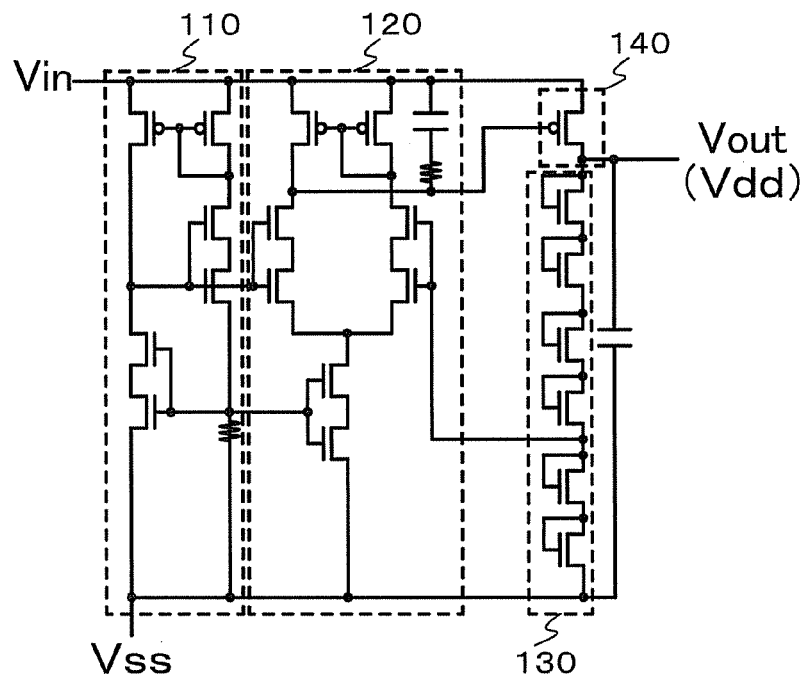

FIG. 7B is an example of a circuit diagram of a regulator circuit.

FIG. 7A and FIG. 7B correspond to each other.

The regulator circuit shown in FIGS. 7A and 7B includes a reference voltage generation circuit 110, a differential circuit 120, a voltage-dividing circuit 130, and a control portion 140.

In FIGS. 7A and 7B, reference symbol Vin denotes an input terminal and Vout (Vdd) denotes an output terminal.

A voltage rectified by a rectifying circuit is input to Vin.

The regulator circuit outputs a constant voltage Vdd.

The control portion 140 directly controls the electrical continuity from Vin to Vout, at which large current flows.

Therefore, it is preferable that the channel width of a transistor in the control portion 140 is set to be ten times as large as that of a transistor in any of the reference voltage generation circuit 110, the differential circuit 120, and the voltage-dividing circuit 130.

Figure 7C:
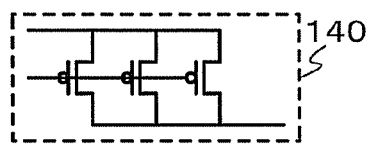

Although one transistor is shown in the control portion 140 in FIG. 7B, a plurality of transistors may be connected in parallel as shown in FIG. 7C.

This embodiment can be combined with any other embodiment.

Embodiment 6

A method in which a peel circuit is used as a chip is described as an example.

Figure 8A:
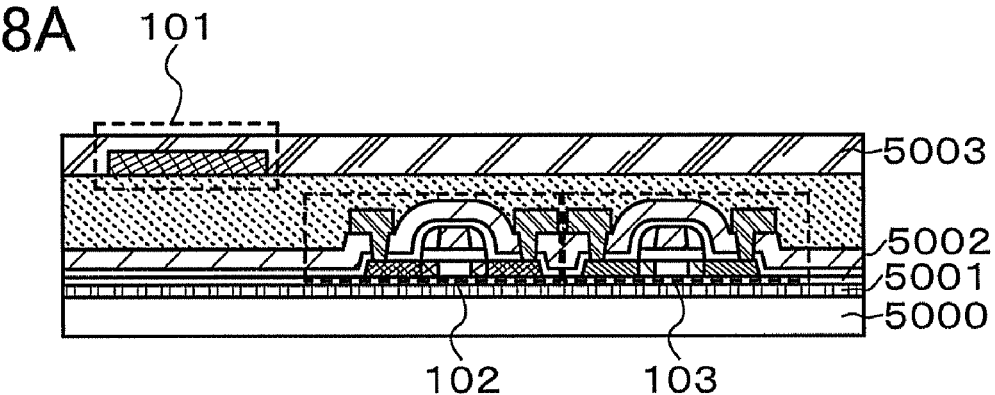
FIGS. 8A and 8B illustrate an example of a method for manufacturing a semiconductor device.

First, as shown in FIG. 8A, a structure including a substrate 5000, a separation layer 5001 provided over the substrate 5000, a base insulating film 5002 provided over the separation layer 5001, an analog circuit 102 and a digital circuit 103 provided over the base insulating film 5002, an antenna 101 provided over the analog circuit 102 and the digital circuit 103 with an interlayer insulating film interposed therebetween, and a protection film 5003 provided over the antenna 101 is formed.

The portion other than the substrate and the separation layer is a chip in FIG. 8A.

A glass substrate, a quartz substrate, a metal substrate, a plastic substrate, or the like can be used as the substrate, and the substrate is not limited thereto.

A metal film having an oxidized or nitrided surface, a silicon film, or the like can be used as the separation layer, and the separation layer is not limited thereto.

A tungsten film, a molybdenum film, a titanium film, a tantalum film, or the like can be used as the metal film, and the metal film is not limited thereto.

The analog circuit and the digital circuit can be formed using a switching element (e.g., a thin film transistor), a resistor, a capacitor, and/or the like, and the analog circuit and the digital circuit are not limited thereto.

A silicon oxide film, a silicon nitride film, a silicon oxide film containing nitrogen, a silicon nitride film containing oxygen, an aluminum nitride film, an aluminum oxide film, a resin film, or the like can be used as each of the base insulating film, the interlayer insulating film, and the protection film, and the base insulating film, the interlayer insulating film, and the protection film are not limited thereto. Each of the base insulating film, the interlayer insulating film, and the protection film may be a single layer or a stacked-layer.

The antenna can be formed using aluminum, titanium, molybdenum, tungsten, gold, silver, copper, or the like, and is not limited thereto. The antenna may be a single layer or a stacked-layer.

Figure 8B:
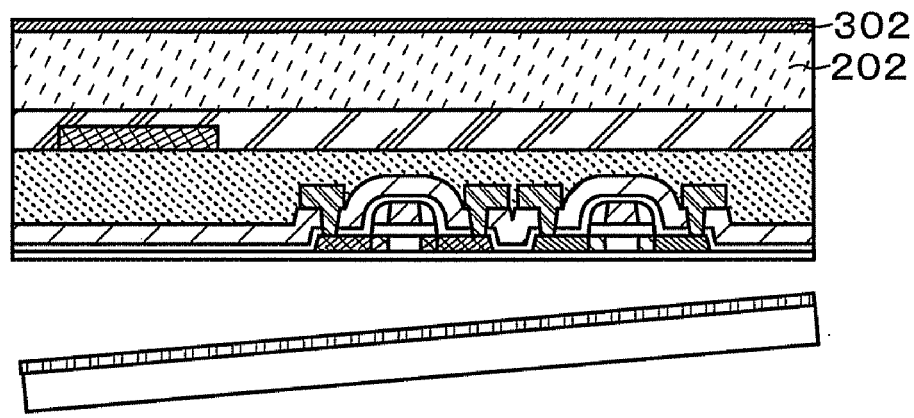

Next, a structure in which a second insulator 202 and a second conductive layer 302 are stacked in order is provided over the protection film 5003. Then, a separation step of separating the substrate 5000 and the separation layer 5001 from the chip is performed (FIG. 8B).

In the case where a metal film having an oxidized or nitrided surface is used as the separation layer, the adhesion between the metal film and the insulating film is weak due to the oxidized or nitrided surface of the metal film.

Therefore, separation of the substrate is enabled by application of mechanical force (for example, by pulling or pushing).

In the case where a silicon film is used as the separation layer, by using halogen fluoride (e.g., chlorine fluoride (ClF), chlorine trifluoride ($ClF_3$), bromine fluoride (BrF), bromine trifluoride ($BrF_3$), iodine fluoride (IF), or iodine trifluoride ($IF_3$)), silicon is etched, so that separation can be performed.

Figure 9A:
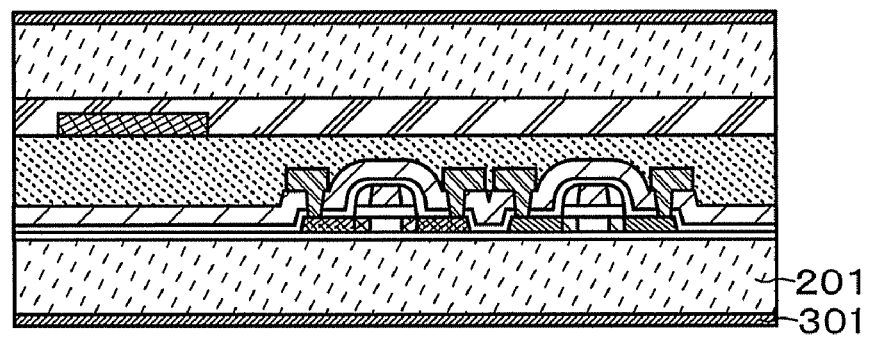
FIGS. 9A and 9B illustrate an example of the method for manufacturing a semiconductor device.

Next, a structure in which a first insulator 201 and a first conductive layer 301 are stacked in order is provided under the base insulating film 5002 (FIG. 9A).

It is preferable that a fiber body which is impregnated with an organic resin be used as each of the first and second insulators.

As the organic resin, a thermosetting resin, a thermoplastic resin, or the like can be used.

As examples of the thermosetting resin, there are an epoxy resin, an unsaturated polyester resin, a polyimide resin, a bismaleimide triazine resin, a cyanate resin, and the like.

As examples of the thermoplastic resin, there are a polyphenylene oxide resin, a polyetherimide resin, a fluoropolymer, and the like.

It is preferable to use a thermosetting resin or a thermoplastic resin because thermocompression bonding is possible so that the manufacturing process can be simplified.

The fibrous body is a woven fabric or a nonwoven fabric.

A woven fabric is a cloth-shaped material obtained by weaving a plurality of fibers.

A nonwoven fabric is a cloth-shaped material obtained by fusion bonding, adhesive bonding, twisting, or the like with use of a plurality of fibers without weaving the plurality of fibers.

As a fiber, a polyvinyl alcohol fiber, a polyester fiber, a polyamide fiber, a polyethylene fiber, an aramid fiber, a polyparaphenylene benzobisoxazole fiber, a glass fiber, a carbon fiber, or the like can be used.

As a glass fiber, a glass fiber using E glass, a glass fiber using S glass, a glass fiber using D glass, a glass fiber using Q glass, or the like can be used.

The fibrous body may be formed using only one kind of the materials of the plurality of fibers, or may be formed using plural kinds of the materials of the plurality of fibers.

Each of the first insulator and the second insulator may be formed using an organic resin which does not include a fibrous body.

As the organic resin in this case, an epoxy resin, an unsaturated polyester resin, a polyimide resin, a bismaleimide triazine resin, a cyanate resin, a polyphenylene oxide resin, a polyetherimide resin, a fluoropolymer, or the like can be used.

The first and second conductive layers are conductive layers for countermeasures against electrostatic breakdown. For each of the first and second conductive layers, titanium, molybdenum, tungsten, aluminum, titanium nitride, tantalum nitride, tungsten nitride, indium oxide, indium tin oxide containing silicon oxide, or the like can be used. The materials for the first and second conductive layers are not limited to the above materials as long as it has an electrical conductivity since the electrostatic withstand voltage can be improved. Each of the first and second conductive layers can be formed by a CVD method, an evaporation method, a sputtering method, or the like. It is preferable that the thickness of each of the first and second conductive layers be 5 to 200 nm (or 10 to 100 nm).

It is preferable that each of the first and second conductive layers at a position which overlaps the antenna be a conductive layer having a plurality of slits such as a conductive layer having a plurality of openings or a net-like conductive layer because more electromagnetic waves are transmitted through the slits so that deviation of the resonant frequency can be suppressed.

The conductive layer having a plurality of slits may be used for either one or both of the first conductive layer and the second conductive layer.

Since electromagnetic waves are transmitted through both of the front surface and the rear surface of the chip to the antenna, it is preferable that the conductive layer having a plurality of slits be provided for both of the first conductive layer and the second conductive layer.

For example, it is preferable that a conductive layer at a position which overlaps the antenna be a conductive layer having a plurality of slits, a conductive layer at a position which overlaps the analog circuit be selectively removed, and a conductive layer at a position which overlaps the digital circuit be left.

It is preferable that a conductive layer at a position which overlaps the antenna be a conductive layer having a plurality of slits, a conductive layer at a position which overlaps the regulator circuit be selectively removed, and a conductive layer at a position which overlaps the circuit other than the regulator circuit be left.

It is preferable that a conductive layer at a position which overlaps the antenna be a conductive layer having a plurality of slits, a conductive layer at a position which overlaps the control portion in the regulator circuit be selectively removed, and a conductive layer at a position which overlaps the circuit other than the control portion be left.

It is preferable that a conductive layer at a position which overlaps the antenna be a conductive layer having a plurality of slits because electrostatic breakdown can keeps to be prevented at the position which overlaps the antenna.

In order to effectively prevent the semiconductor device from being damaged by static electricity, it is preferable that the sheet resistance of the conductive layer be less than or equal to $1.0 \times 10^7$ Ω/square. Particularly, it is preferable to be less than or equal to $1.0 \times 10^4$ Ω/square, and it is far preferable to be less than or equal to $1.0 \times 10^2$ Ω/square.

Although the structure in which the conductive layer is provided for the surface of the insulator is attached to the chip is described in this embodiment, a conductive layer may be formed on the surface of an insulator after the insulator is attached to the chip.

Next, the periphery of the region in which the antenna 101, the analog circuit 102, and the digital circuit 103 are provided is cut by laser.

Figure 9B:
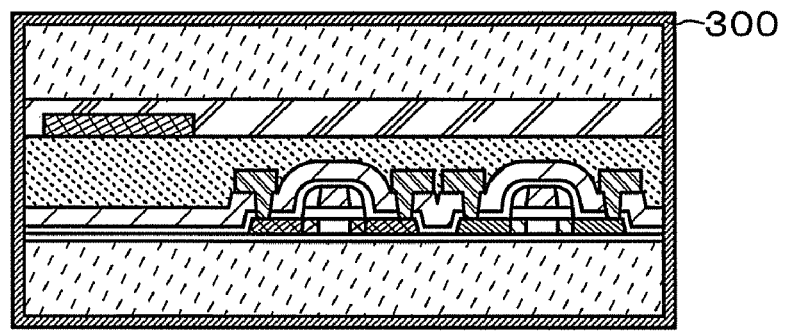

The laser cutting melts the first conductive layer 301 and the second conductive layer 302, so that the first conductive layer 301 is electrically connected to the second conductive layer 302 to form a conductive layer 300 (FIG. 9B).

The opening provided in the conductive layer may be formed before the first and second insulators are attached to the chip or may be formed after that.

It is preferable to form the opening in the conductive layer after the first and second insulators are attached to the chip because etching can be performed while viewing the circuit position so that the opening and the circuit can be easily aligned.

The opening can be formed by a method in which the conductive layer is ablated by laser to be removed, a method in which the conductive layer is polished by a file or the like to be removed, a method in which the conductive layer is etched using a resist mask or the like, or the like. In the case where the conductive layer is provided on the inner side of the pair of insulators, the pair of insulators may be provided after the formation of the opening.

In the case where the conductive layer is a transparent conductive layer (such as indium oxide or indium tin oxide containing silicon oxide), a portion to be etched can be viewed as it is.

In the case where the conductive layer is a light-shielding conductive layer (such as metal), a portion to be etched cannot be viewed as it is; this problem can be solved by irradiation with light from the rear.

That is, the light-shielding conductive layer which is in a film state is very thin, and therefore, the circuit can be seen through by the irradiation with light form the rear.

The first conductive layer 301 may be electrically connected to the second conductive layer 302 by a conductor provided on the side surface.

The step of selectively separating at least a substrate by using a separation layer as described in Embodiment is referred to as a separation step. In addition, a circuit from which a substrate is selectively separated in the separation step is referred to as a separation circuit. Alternatively, such a circuit may be referred to as a peel circuit because it is a thin circuit like skin after the substrate is separated. The peel circuit may be formed by a different method such as a method for forming a peel circuit by removing a substrate with an etchant or a method for forming a peel circuit by forming a circuit over a flexible substrate.

The peel circuit is very thin, which leads to reduction in weight of the chip.

On the other hand, the peel circuit is extremely weak in pulling, pressure from the outside, or the like because it is very thin.

The insulator in which a fibrous body is impregnated with an organic resin, which includes the fibrous body, has high resistance against pulling and can diffuse pressure from the outside.

In the peel circuit, the distance between the circuit and the conductive layer is small, and therefore, it is preferable to provide an opening in the conductive layer on the circuit side.

This is because when the distance between the circuit and the conductive layer is small, the parasitic capacitance formed between the circuit and the conductive layer becomes large.

Further, the distance between the circuit and the conductive layer is small also on the antenna side, and therefore, it is preferable to provide an opening in the conductive layer on the antenna side.

This embodiment can be combined with any other embodiment.

Embodiment 7

Although the method in which a peel circuit is used as the chip is described in Embodiment 6 as an example, a chip using a transistor formed over an insulating substrate, a chip using a transistor formed using an SOI substrate, a chip using a transistor formed using a semiconductor substrate, or the like may be used.

In such a chip described in this embodiment, the substrate has a thickness which is sufficient large, and therefore, the parasitic capacitance formed between the circuit and the conductive layer is small.

Therefore, in the case of using the chip described in this embodiment, the distance between the circuit and the conductive layer is small on the antenna side, and therefore, it is preferable to provide an opening in the conductive layer on the antenna side. However, the parasitic capacitance is not necessarily formed between the circuit and the conductive layer on the circuit side at all, and therefore, it is preferable to provide an opening on the circuit side.

This embodiment can be combined with any other embodiment.

Embodiment 8

Although the conductive layer is provided on the outer side of the first and second insulators in Embodiment 6, the conductive layer may be provided on the inner side of the first and second insulators.

That is, a pair of conductive layers may be provided between a pair of insulators, and a chip may be provided between the pair of conductive layers. In that case, the conductive layer on the antenna side may be provided over a protection film or between an antenna and a circuit. The conductive layer on the circuit side may be provided under a base insulating film.

Although the first conductive layer is electrically connected to the second conductive layer in Embodiment 6, the first conductive layer and the second conductive layer are not necessarily electrically connected to each other. The method for electrical connection includes, but not limited to, a method for connection in which melting is performed by laser, a method for connection in which a connection electrode is formed in a contact hole formed in the insulating layer, and the like.

This embodiment can be combined with any other embodiment.

Embodiment 9

Although the conductive layer is provided both on the circuit side and on the antenna side in the above embodiments, electrostatic breakdown can be prevented even in the structure in which a conductive layer is provided on either one of the circuit side and the antenna side.

Occurrence of NAKANUKE failure can also be prevented since the conductive layer is not provided on the other of the circuit side and the antenna side.

This embodiment can be combined with any other embodiment.

Example 1

In order to demonstrate an effect of countermeasures against electrostatic breakdown, measurement of ESD (electrostatic discharge) was performed.

The measurement of ESD was performed in the manner described below.

First, an aluminum plate was put on a glass substrate (which is 0.5-mm-thick). Then, a conductive sheet was put on the aluminum plate, and a sample was put on the conductive sheet.

Then, from above the sample (semiconductor device), a predetermined voltage was applied with an ESD tester (manufactured by TAKAYA Corporation, for simple response evaluation).

Next, electricity of the sample (semiconductor device) to which the predetermined voltage was applied was removed for one minute.

After that, whether or not the sample (semiconductor device) from which the electricity was removed operates was determined.

Then, while increasing the predetermined voltage from 1 kV to 15 kV, a voltage at which the sample (semiconductor device) was not able to operate was measured.

In addition, the measurement was performed in two cases: the case where voltage was applied from a front surface (an antenna side) of the sample (semiconductor device) and the case where voltage was applied from a rear surface (a thin film transistor side) of the sample (semiconductor device).

Note that it was determined that a sample (semiconductor device) which operated after a voltage of 15 kV was applied had at least an electrostatic withstand voltage of 15 kV or higher.

Here, the samples on which the measurement was performed are described.

(Comparison Structure: structure which does not include a conductive layer for countermeasures against electrostatic breakdown)

As Comparison Structure, a structure including a first insulator 11, a circuit 12 including a thin film transistor provided over the first insulator 11, an antenna 13 which is provided over and electrically connected to the circuit 12 including a thin film transistor, a protection film (a silicon nitride film) 14 provided over the antenna 13, and a second insulator 15 provided over the protection film 14 was manufactured (see FIG. 25A).

In Comparison Structure, a conductive layer for countermeasures against electrostatic breakdown was not provided.

As each of the first insulator and the second insulator, a prepreg (which is 20-μm-thick) which is a structural body in which a fibrous body (a glass fiber) is impregnated with an organic resin (a brominated epoxy resin) was used.

Samples which were manufactured are described below.

A peel circuit was used as a ship, and a prepreg which is a structural body in which a fibrous body (a glass fiber) is impregnated with an organic resin was used as each of a first insulator and a second insulator.

(Structure 1: structure in which a conductive layer for countermeasures against electrostatic breakdown is provided on only a front side (an antenna side))

As Structure 1, a structure in which a conductive layer 16 for countermeasures against electrostatic breakdown is provided only on the front side (the antenna side) of Comparison Structure was manufactured (see FIG. 25B).

The structure of a thin film transistor, the structure of a circuit, the shape of an antenna, a manufacturing material, and the like of Structure 1 were the same as those of Comparison Structure.

A sample in which a 10-nm-thick titanium (Ti) film was formed as the conductive layer was manufactured.

(Structure 2: structure in which a conductive layer for countermeasures against electrostatic breakdown is provided on only a rear side (a thin film transistor side))

As Structure 2, a structure in which a conductive layer 17 for countermeasures against electrostatic breakdown is provided only on the rear side (the thin film transistor side) of Comparison Structure was manufactured (see FIG. 25C).

The structure of a thin film transistor, the structure of a circuit, the shape of an antenna, a manufacturing material, and the like of Structure 2 were the same as those of Comparison Structure.

A sample in which a 10-nm-thick titanium (Ti) film was formed as the conductive layer was manufactured.

(Structure 3: structure in which a conductive layer for countermeasures against electrostatic breakdown is provided on a front side (an antenna side) and on a rear side (a thin film transistor side) (the structure does not have electrical continuity between top and bottom))

As Structure 3, a structure in which conductive layers 18 and 19 for countermeasures against electrostatic breakdown are provided on the front side (the antenna side) and on the rear side (the thin film transistor side) of Comparison Structure was manufactured (see FIG. 25D).

The structure of a thin film transistor, the structure of a circuit, the shape of an antenna, a manufacturing material, and the like of Structure 3 were the same as those of Comparison Structure.

The conductive layer on the front side (the antenna side) and the conductive layer on the rear side (the thin film transistor side) were not electrically connected to each other.

A sample in which a 10-nm-thick titanium (Ti) film was formed as the conductive layer and a sample in which a 10-nm-thick indium tin oxide film containing silicon oxide (ITO (containing $SiO_2$)) was formed as the conductive layer were manufactured.

(Structure 4: structure in which a conductive layer for countermeasures against electrostatic breakdown is provided on a front side (an antenna side) and on a rear side (a thin film transistor side) (the structure has electrical continuity between top and bottom))

As Structure 4, a structure in which a first insulator 11, a circuit 12 including a thin film transistor, an antenna 13, a protection film 14, and a second insulator 15 are surrounded by a conductive layer 20 by conductive layers for countermeasures against electrostatic breakdown which are provided on the front side (the antenna side) and on the rear side (the thin film transistor side) of Comparison Structure and electrically connected to each other was manufactured (see FIG. 25E).

The structure of a thin film transistor, the structure of a circuit, the shape of an antenna, a manufacturing material, and the like of Structure 4 were the same as those of Comparison Structure.

The conductive layer on the front side (the antenna side) and the conductive layer on the rear side (the thin film transistor side) were electrically connected to each other.

A sample in which a 10-nm-thick titanium (Ti) film was formed as the conductive layer, a sample in which a 10-nm-thick indium tin oxide film containing silicon oxide (ITO (containing $SiO_2$)) was formed as the conductive layer, and a sample in which a 100-nm-thick indium tin oxide film containing silicon oxide (ITO (containing $SiO_2$)) was formed as the conductive layer were manufactured.

(Structure 5: structure in which a conductive layer for countermeasures against electrostatic breakdown is provided on a front side (an antenna side) and on a rear side (a thin film transistor side) of the inner side of an insulator)

As Structure 5, a structure in which conductive layers 21 and 22 for countermeasures against electrostatic breakdown are provided on the inner side of the insulator in Comparison Structure was manufactured. Specifically, the conductive layer 21 was provided between the first insulator and the circuit including a thin film transistor and the conductive layer 22 was provided between the second insulator and the protection film (see FIG. 25F).

The structure of a thin film transistor, the structure of a circuit, the shape of an antenna, a manufacturing material, and the like of Structure 5 were the same as those of Comparison Structure.

The conductive layer on the front side (the antenna side) and the conductive layer on the rear side (the thin film transistor side) were electrically connected to each other.

A sample in which a 10-nm-thick indium tin oxide film containing silicon oxide (ITO (containing $SiO_2$)) was formed as the conductive layer was manufactured.

(Structure 6: structure in which a conductive layer for countermeasures against electrostatic breakdown is provided on only a front side (an antenna side) of the inner side of an insulator)

As Structure 6, a structure in which a conductive layer 23 for countermeasures against electrostatic breakdown is provided on the inner side of the insulator in Comparison Structure was manufactured. Specifically, the conductive layer 23 was provided between a second insulator and a protection film (see FIG. 25G).

The structure of a thin film transistor, the structure of a circuit, the shape of an antenna, a manufacturing material, and the like of Structure 6 were the same as those of Comparison Structure.

A sample in which a 10-nm-thick indium tin oxide film containing silicon oxide (ITO (containing $SiO_2$)) was formed as the conductive layer was manufactured.

(Measurement Results and Consideration)

The measurement results of Comparison Structure and Structures 1 to 6 are shown in FIG. 26.

Note that the result of Comparison Structure is an average value of four samples, and the result of each of Structures 1 to 6 is an average value of five samples.

From the comparison of the result of Comparison Structure and the results of Structures 1 to 6, it is found that electrostatic withstand voltage is increased with respect to application of voltage from a surface on which a conductive layer for countermeasures against electrostatic discharge is provided.

Therefore, it is clear that electrostatic withstand voltage is increased by providing a conductive layer.

Thus, in the case of a semiconductor device which can transmit and receive radio waves to and from both of the front surface and the rear surface like an IC card, it is preferable to provide a conductive layer on both the front surface and the rear surface.

Needless to say, since there is an effect of increasing the electrostatic withstand voltage even in the case where a conductive layer is provided on only a single surface, the present invention is not limited to the structure in which a conductive layer is provided on both the front surface and the rear surface.

In addition, from the measurement results of Comparison Structure (FIG. 25A), Structure 1 (FIG. 25B), and Structure 6 (FIG. 25G), it can be understood that the semiconductor device has lower electrostatic withstand voltage on the rear surface side (the thin film transistor side).

The reason for this is that a thin film transistor or a wiring included in a circuit is damaged by static electricity, which makes the semiconductor device unable to operate.

Therefore, in the case where a conductive layer is provided on only a single surface, it is preferable to provide the conductive layer on the rear surface side (the thin film transistor side).

In addition, from the measurement results of Comparison Structure (FIG. 25A), Structure 5 (FIG. 25F), and Structure 6 (FIG. 25G), it can be understood that there is an effect of increasing electrostatic withstand voltage even in the case where a conductive layer is provided on the inner side of the insulator.

Further, since either the indium tin oxide film containing silicon oxide or the titanium film has an effect of increasing electrostatic withstand voltage, it can be understood that any conductive layer has an effect of increasing electrostatic withstand voltage regardless of material.

Furthermore, in Structure 4 (FIG. 25E), the effect of increasing electrostatic withstand voltage increased as the thickness of the conductive layer became larger (as the resistance value of the conductive layer decreased).

Therefore, it can be understood that the effect of increasing electrostatic withstand voltage is improved when the resistance value of the conductive film is decreased.

In addition, the electrostatic withstand voltages of Structure 4 (FIG. 25E) and Structure 5 (FIG. 25F) were extremely higher than those of the other structures. The average of the electrostatic withstand voltage of the other structures was in the single digit in kilovolts (lower than 10 kV), whereas the average of the electrostatic withstand voltage of Structures 4 and 5 was in the two digits in kilovolts (equal to or higher than 10 kV).

This point can be explained by consideration of dielectric polarization.

That is, each sample of this example includes the first insulator and the second insulator.

Thus, dielectric polarization is generated when one of surfaces of the first insulator or the second insulator is charged, so that the other of the surfaces is charged to have a polarity opposite to that of the one of the surfaces.

Then, current flows to the circuit provided between the first insulator and the second insulator when dielectric polarization is generated, whereby the circuit may be damaged by static electricity.

On the other hand, with the structure in which the conductive layer on the front surface and the conductive layer on the rear surface are electrically connected to each other like Structure 4 (FIG. 25E) and Structure 5 (FIG. 25F), the potential of the conductive layer on the front surface and the potential of the conductive layer on the rear surface are kept at the same level.

Therefore, in the structure in which the conductive layer on the front surface and the conductive layer on the rear surface are electrically connected to each other, even when one of surfaces of the first insulator or the second insulator is charged, the other of the surfaces is charged to have the same potential as the potential of the one surface.

Accordingly, an adverse effect of electrostatic discharge due to dielectric polarization can be reduced in Structure 4 (FIG. 25E) and Structure (FIG. 25F), so that the electrostatic withstand voltage becomes higher than those of the other structures.

Needless to say, the present invention is not limited to the structures of this example.

In Structure 4, all the periphery is surrounded by the conductive layer as shown in FIG. 25E; however, it is clear from the results of this example that an adverse effect of dielectric polarization can be reduced in any structure as long as it is a structure in which a conductive layer on a front surface and a conductive layer on a rear surface are electrically connected to each other.

Example 2

In Example 1, it is described that the effect of increasing electrostatic withstand voltage is improved by increasing the thickness of the conductive layer.

On the other hand, change in resonant frequency of the circuit due to increase in thickness of the conductive film is a concern.

That is, the semiconductor devices which perform wireless communication via an antenna are operated by radio waves with a certain frequency which is input from the outside.

When the resonant frequency of the circuit is close to the frequency of a radio wave which is input from the outside, the semiconductor devices which perform wireless communication via an antenna are easily operated.

On the other hand, when the resonant frequency of the circuit is not close to the frequency of a radio wave which is input from the outside, the semiconductor devices which perform wireless communication via an antenna are not easily operated.

Further, the resonant frequency can be set by the number of winding of the antenna or the circuit design.

Therefore, if actual resonant frequency deviates from the resonant frequency which is set, by providing the conductive film, the performance of the semiconductor devices which perform wireless communication via an antenna deteriorates.

Thus, in this example, an adverse effect on resonant frequency due to difference in thickness of a conductive layer was examined.

As samples, the sample of Comparison Structure in Example 1, the sample in which the 10-nm-thick indium tin oxide film containing silicon oxide (ITO (containing $SiO_2$)) was formed in Structure 4 (FIG. 25E) in Example 1, and the sample in which the 100-nm-thick indium tin oxide film containing silicon oxide (ITO (containing $SiO_2$)) was formed in Structure 4 in Example 1 were manufactured.

The samples were manufactured so that components other than the structure and the thickness of the conductive layer were the same in the samples.

Measurement results are described below.

In the sample of Comparison Structure (FIG. 25A) where the conductive layer is not provided, the resonant frequency was 15.5 MHz.

In the sample where the thickness of the conductive layer was 10 nm in Structure 4 (FIG. 25E), the resonant frequency was 14.3 MHz.

In the sample where the thickness of the conductive layer was 100 nm in Structure 4 (FIG. 25E), the resonant frequency was 13.0 MHz.

From the above results, it was found that as the thickness of the conductive layer becomes larger, deviation of the resonant frequency becomes larger.

From the results in this example, it is preferable to remove a conductive layer at a region which overlaps an antenna since the deviation in the resonance frequency can be prevented.

Further, in order to keep preventing electrostatic breakdown, it is preferable not to prevent a conductive layer entirely but to remove a part of the conductive layer to be a conductive layer having a plurality of slits.

Example 3

A problem of NAKANUKE failure was examined.
(Comparison Sample)

Comparison Sample is a sample in which a conductive layer is provided entirely on the periphery of first and second insulators as shown in FIGS. 1A and 1B.

A chip was formed using a peel circuit and prepregs which are structural bodies in each of which a fiber body (glass fiber) is impregnated with an organic resin were used.

An indium tin oxide film containing silicon oxide (ITO (containing $SiO_2$)) was used as the conductive layer.
(Sample 1)

A sample having the same structure as Comparison Sample was prepared.

Then, a part of the conductive layer on a circuit side was removed with sandpaper, so that an opening was formed selectively in the conductive layer at a portion which overlaps an analog circuit in the sample as shown in FIGS. 2A and 2B.
(Sample 2)

A sample having the same structure as Comparison Sample was prepared.

Then, a part of the conductive layer on a circuit side was removed with sandpaper, so that an opening was formed selectively in the conductive layer at a portion which overlaps an analog circuit and a digital circuit in the sample as shown in FIGS. 4A and 4B.
(Sample 3)

A sample having the same structure as Comparison Sample was prepared.

Then, a part of the conductive layer on a circuit side was removed with sandpaper, so that an opening was formed selectively in the conductive layer at a portion which overlaps an antenna, an analog circuit, and a digital circuit in the sample as shown in FIGS. 5A and 5B.
(Evaluation Result)

NAKANUKE failure was confirmed in Comparison Sample and NAKANUKE failure was not confirmed in Samples 1 to 3.

Therefore, it was found that NAKANUKE failure does not occur when a conductive layer at a position which overlaps at least the analog circuit is removed.

From the above result, it seems that NAKANUKE failure is caused by formation of parasitic capacitance between the analog circuit and the conductive layer.

In this example, a first conductive layer which is provided on the circuit side is removed. In the case of the peel circuit, the distance between the first conductive layer and the analog circuit and the distance between a second conductive layer and the analog circuit are not different from each other so much. Therefore, it is clear that the same effect can be provided also by removing the second conductive layer provided on an antenna side. This is because the parasitic capacitance which may cause NAKANUKE failure is reduced by removing either one of the first conductive layer and the second conductive layer.

Example 4

It was evaluated whether occurrence of NAKANUKE failure is prevented by removing a conductive layer at a part of the region of a regulator circuit.

(Comparison Sample)

Figure 10:
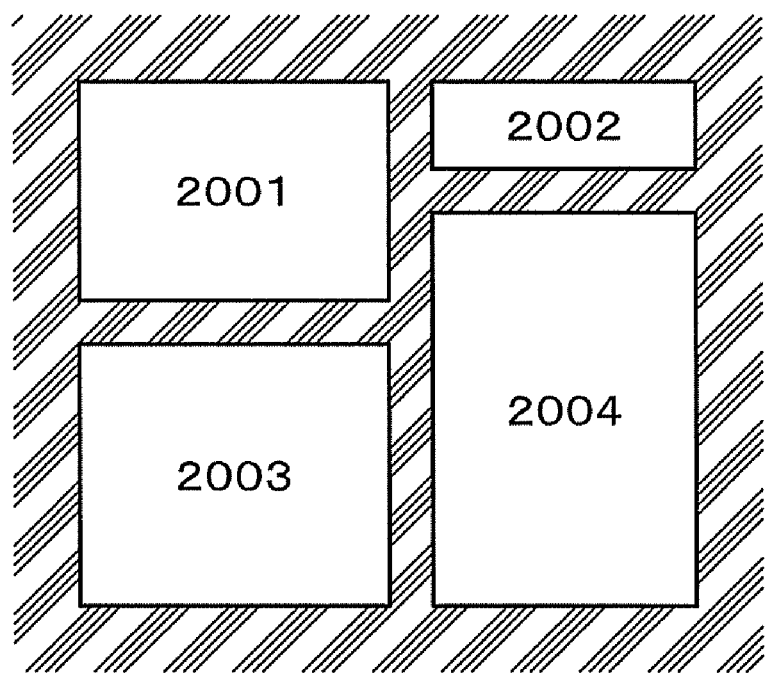
FIG. 10 illustrates an example of a regulator circuit.

Comparison Sample is a sample having the same structure as Comparison Sample of Example 3 (FIGS. 1A and 1B and FIG. 10).

FIG. 10 shows a regulator circuit including a region 2001 in which a capacitor is provided, a control portion 2002, a region 2003 in which a resistor is provided, and a region 2004 in which a circuit other than the control portion is provided.

Figure 11A:
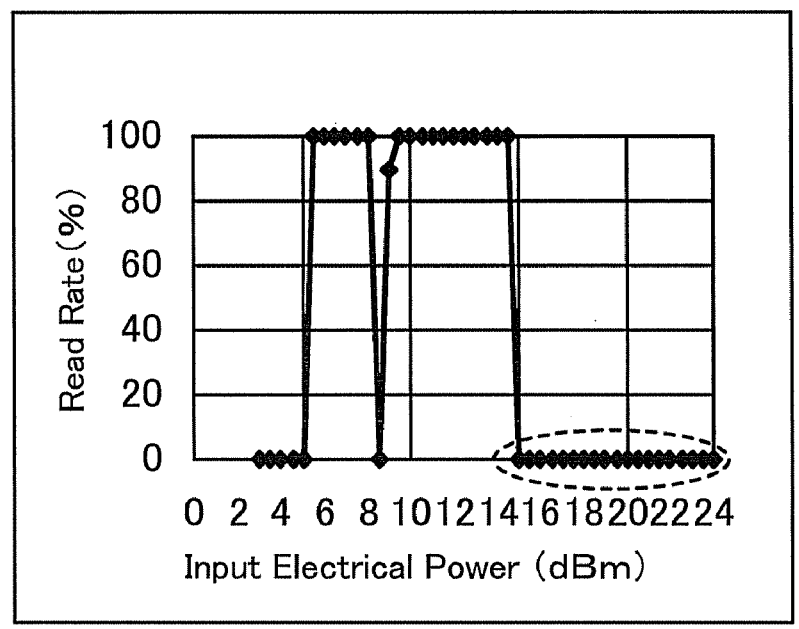
FIGS. 11A and 11B show measurement results (ASK)
Figure 11B:
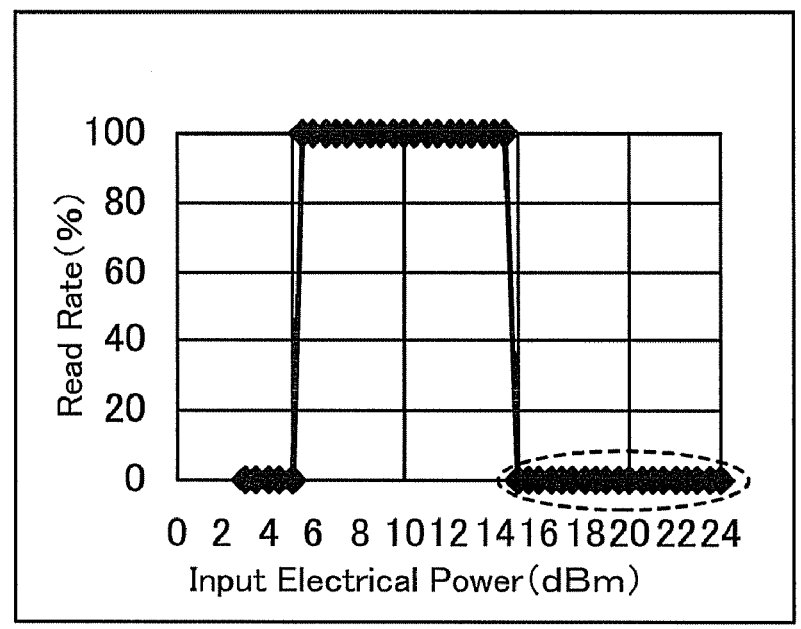
Figure 12A:
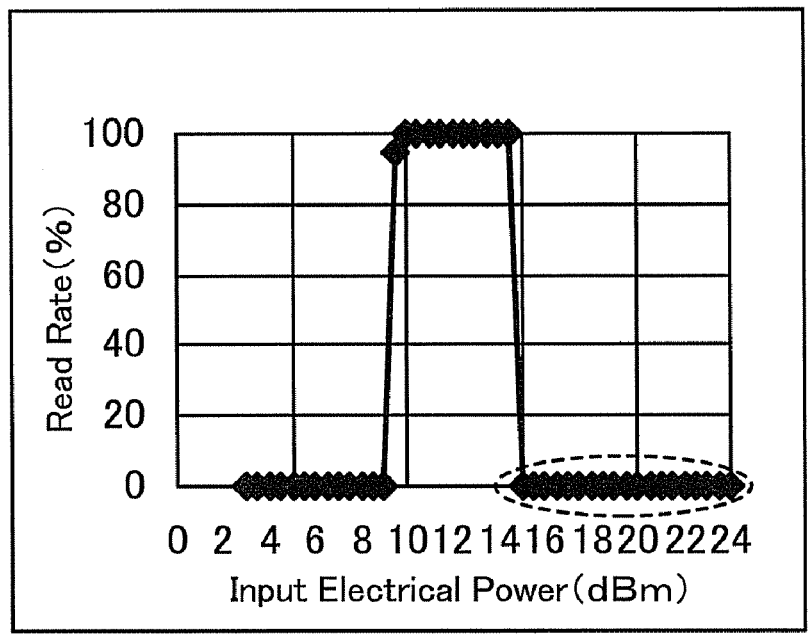
FIGS. 12A and 12B show measurement results (FSK)
Figure 12B:
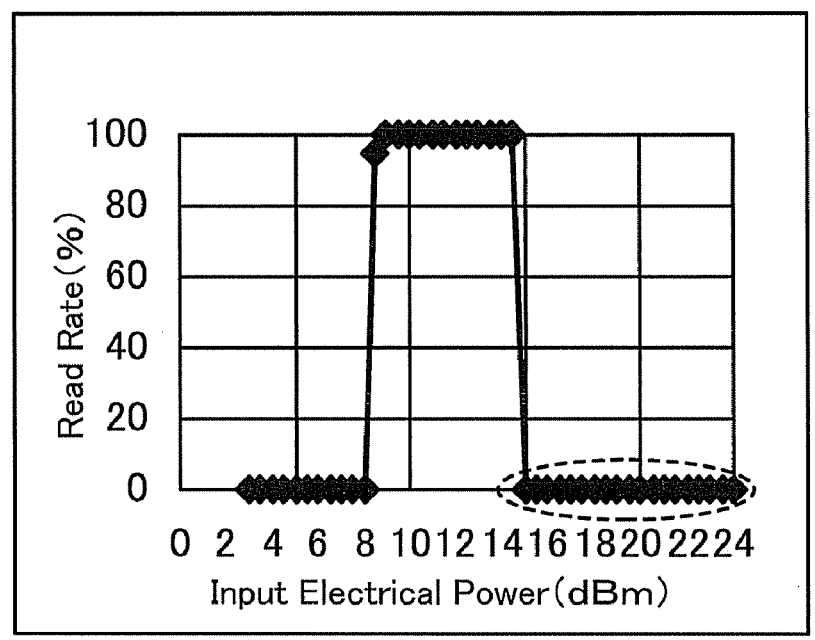

FIGS. 11A and 11B are graphs where the measurement is performed by amplitude shift keying (ASK) for the modulation, and FIGS. 12A and 12B are graphs where the measurement is performed by frequency shift keying (FSK) for the modulation. FIGS. 11A and 12A are the ones in the case where the modulation index is 10% and FIGS. 11B and 12B are the ones in the case where the modulation index is 100%. This evaluation method was in accordance with ISO 15693.

In FIGS. 11A and 11B and FIGS. 12A and 12B, the vertical axis indicates a read rate (%) and the horizontal axis indicates an input electrical power (dBm).

The input electrical power (dBm) increases as the distance between a semiconductor device and a reader/writer decreases.

For example, 5 dBm was measured at a distance of about 30 mm between the semiconductor device and the reader/writer, 10 dBm was measured at a distance of about 20 mm between the semiconductor device and the reader/writer, and 15 dBm was measured at a distance of about 10 mm between the semiconductor device and the reader/writer.

As shown by a broken line in each of FIGS. 11A and 11B and FIGS. 12A and 12B, data was not able to be read at high electric power (near an antenna of the reader/writer) in Comparison Sample.

Accordingly, NAKANUKE failure occurred in this sample.

(Sample 4)

First, a sample having the same structure as Comparison Sample was prepared (FIGS. 1A and 1B and FIG. 10).

Then, as shown in FIG. 13, a part of the conductive layer over the entire of the regulator circuit was selectively removed by laser ablation as shown by a broken line. The removal of the conductive layer was performed only on the circuit side.

Figure 14A:
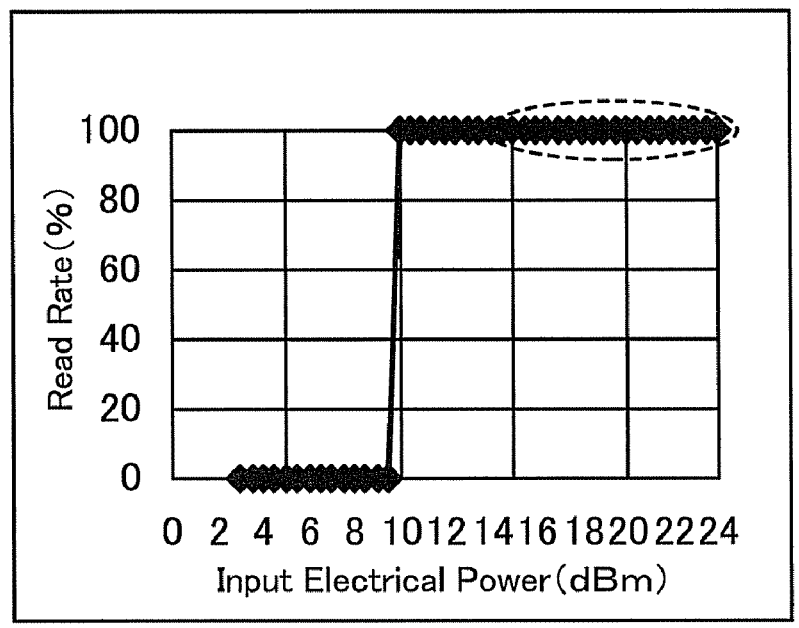
FIGS. 14A and 14B show measurement results (ASK)
Figure 14B:
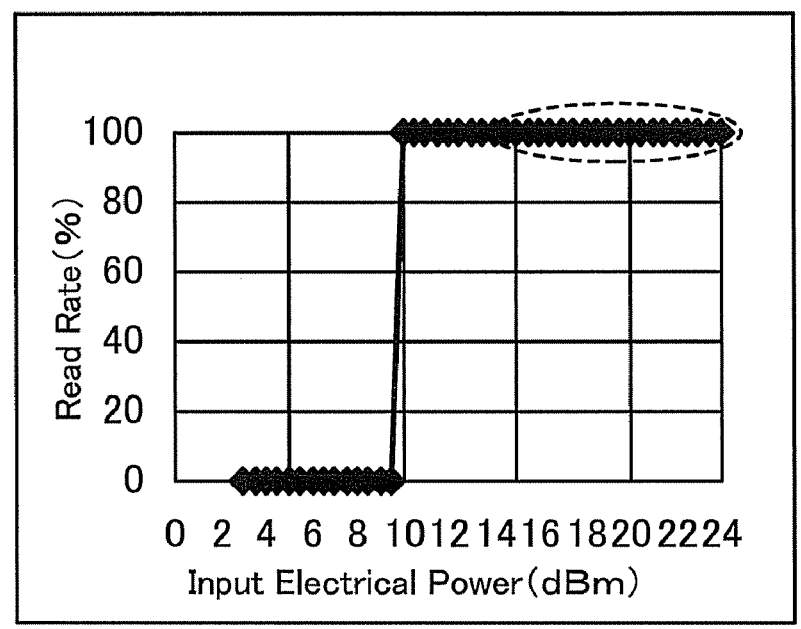
Figure 15A:
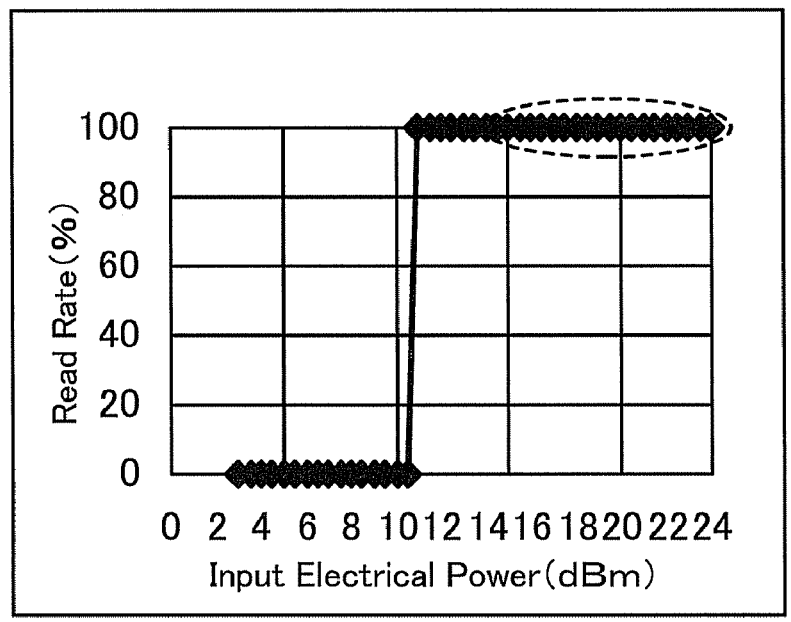
FIGS. 15A and 15B show measurement results (FSK)
Figure 15B:
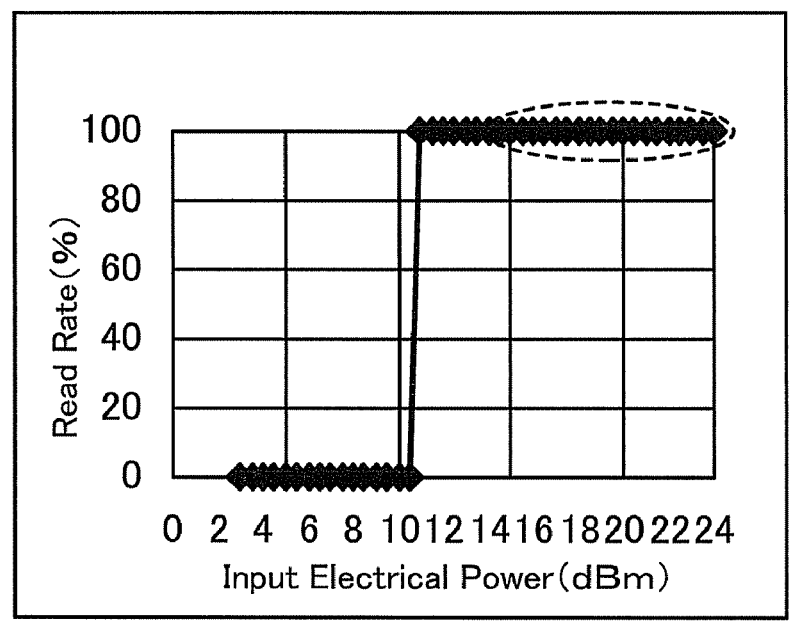

FIGS. 14A and 14B are graphs where the measurement is performed by amplitude shift keying (ASK) for the modulation, and FIGS. 15A and 15B are graphs where the measurement is performed by frequency shift keying (FSK) for the modulation. FIGS. 14A and 15A are the ones in the case where the modulation index is 10% and FIGS. 14B and 15B are the ones in the case where the modulation index is 100%. This evaluation method was in accordance with ISO 15693.

In FIGS. 14A and 14B and FIGS. 15A and 15B, the vertical axis indicates a read rate (%) and the horizontal axis indicates an input electrical power (dBm).

The input electrical power (dBm) increases as the distance between a semiconductor device and a reader/writer decreases.

For example, 5 dBm was measured at a distance of about 30 mm between the semiconductor device and the reader/writer, 10 dBm was measured at a distance of about 20 mm between the semiconductor device and the reader/writer, and 15 dBm was measured at a distance of about 10 mm between the semiconductor device and the reader/writer.

As shown by a broken line in each of FIGS. 14A and 14B and FIGS. 15A and 15B, data was able to be read at high electric power (near an antenna of the reader/writer) in Sample 4.

Accordingly, NAKANUKE failure did not occur in this sample.

(Sample 5)

First, a sample having the same structure as Comparison Sample was prepared (FIGS. 1A and 1B and FIG. 10).

Figure 16:
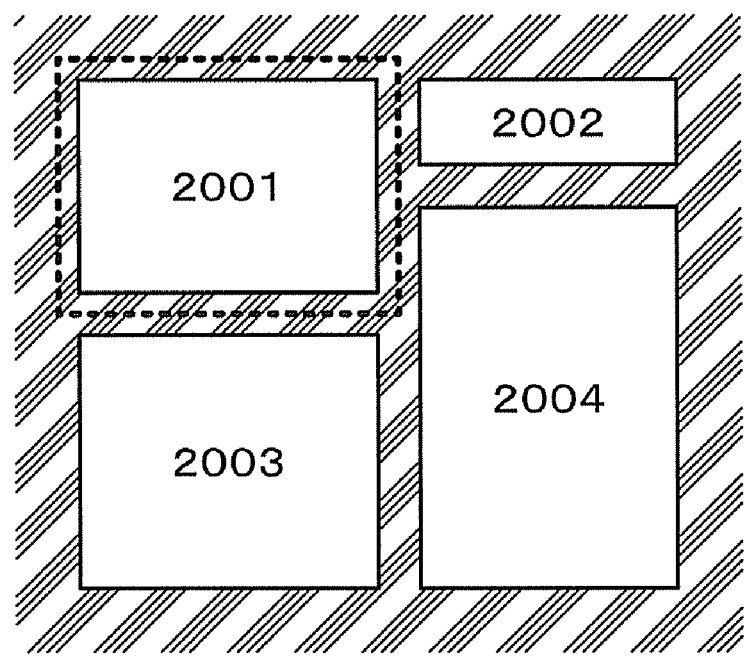
FIG. 16 illustrates an example of a regulator circuit.

Then, as shown in FIG. 16, a part of the conductive layer in the region 2001 in which a capacitor is provided was selectively removed by laser ablation as shown by a broken line. The removal of the conductive layer was performed only on the circuit side.

Figure 17A:
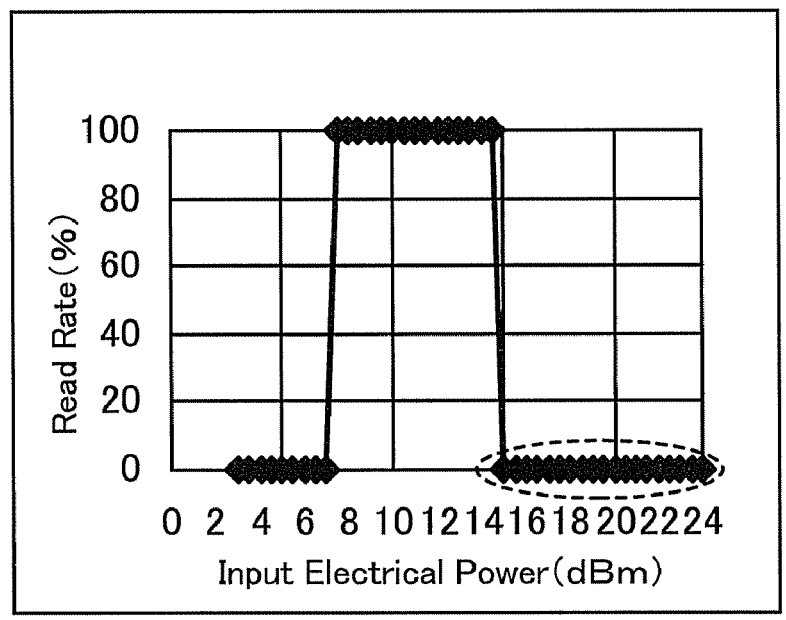
FIGS. 17A and 17B show measurement results (ASK)
Figure 17B:
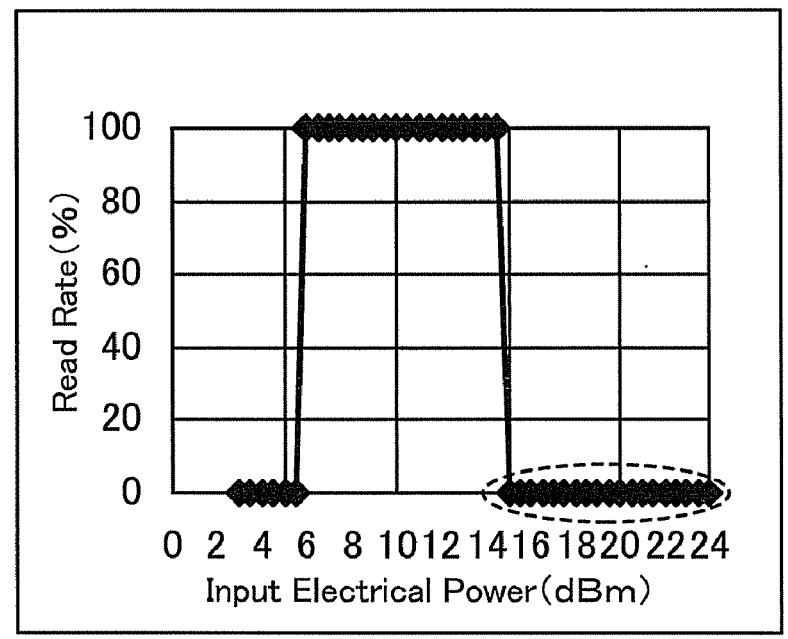
Figure 18A:
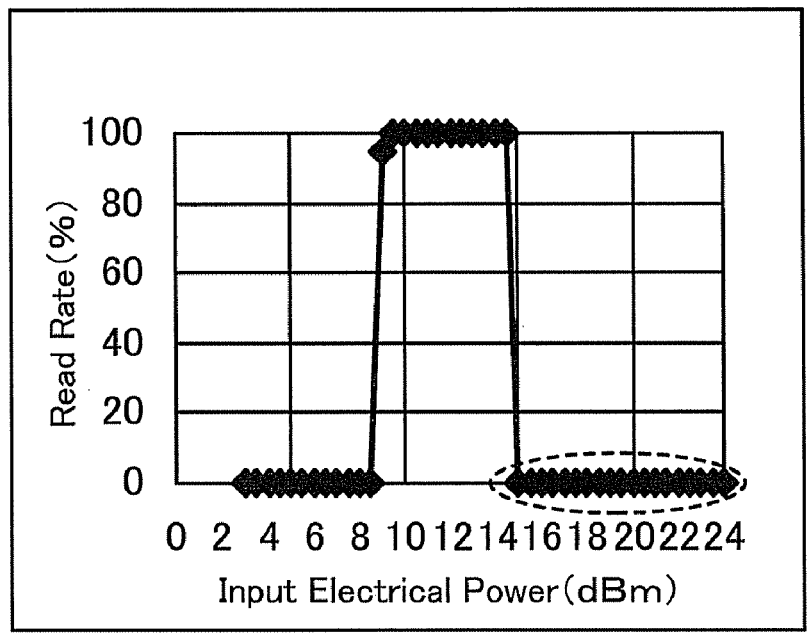
FIGS. 18A and 18B show measurement results (FSK)
Figure 18B:
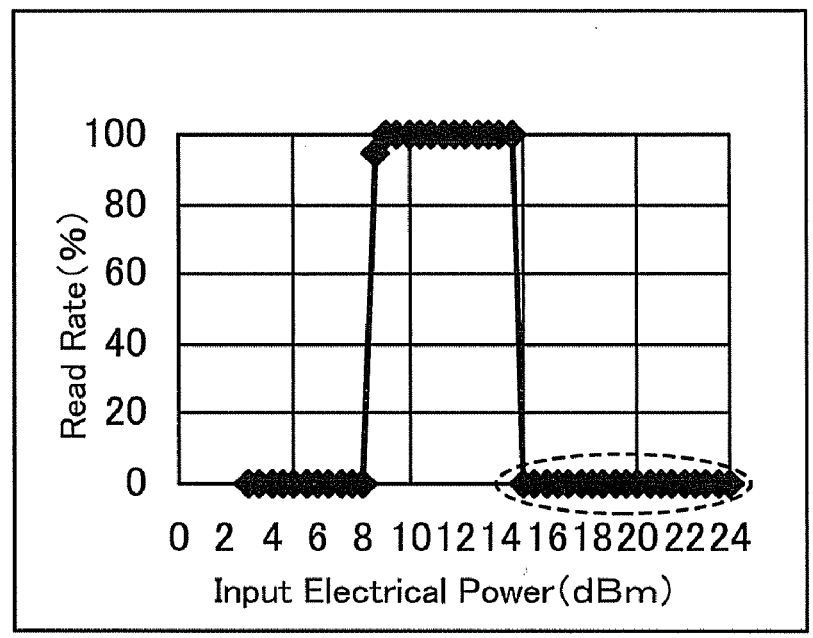

FIGS. 17A and 17B are graphs where the measurement is performed by amplitude shift keying (ASK) for the modulation, and FIGS. 18A and 18B are graphs where the measurement is performed by frequency shift keying (FSK) for the modulation. FIGS. 17A and 18A are the ones in the case where the modulation index is 10% and FIGS. 17B and 18B are the ones in the case where the modulation index is 100%. This evaluation method was in accordance with ISO 15693.

In FIGS. 17A and 17B and FIGS. 18A and 18B, the vertical axis indicates a read rate (%) and the horizontal axis indicates an input electrical power (dBm).

The input electrical power (dBm) increases as the distance between a semiconductor device and a reader/writer decreases.

For example, 5 dBm was measured at a distance of about 30 mm between the semiconductor device and the reader/writer, 10 dBm was measured at a distance of about 20 mm between the semiconductor device and the reader/writer, and 15 dBm was measured at a distance of about 10 mm between the semiconductor device and the reader/writer.

As shown by a broken line in each of FIGS. 17A and 17B and FIGS. 18A and 18B, data was not able to be read at high electric power (near an antenna of the reader/writer) in Sample 5.

Accordingly, NAKANUKE failure occurred in this sample.

(Sample 6)

First, a sample having the same structure as Comparison Sample was prepared (FIGS. 1A and 1B and FIG. 10).

Then, as shown in FIG. 19, a part of the conductive layer in the region 2001 in which a capacitor is provided and in the control portion 2002 was selectively removed by laser ablation as shown by a broken line. The removal of the conductive layer was performed only on the circuit side.

Figure 20A:
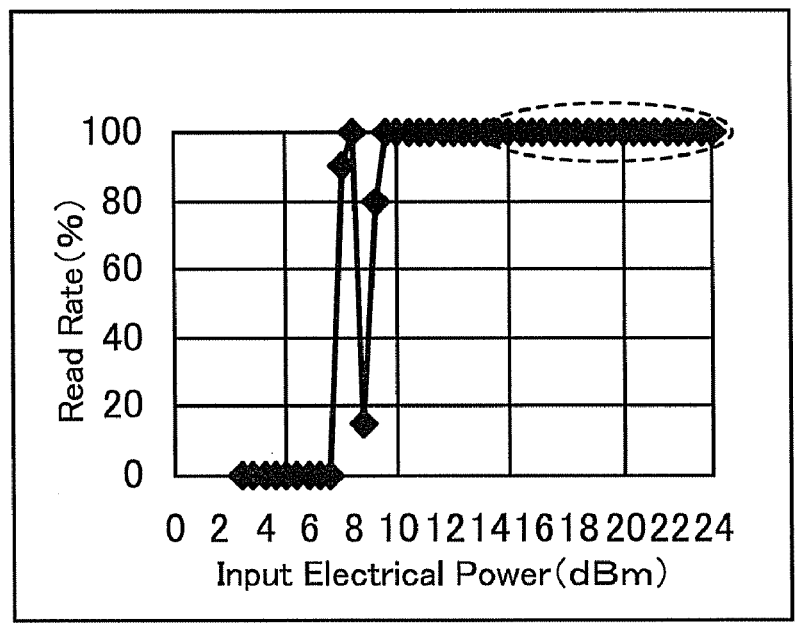
FIGS. 20A and 20B show measurement results (ASK)
Figure 20B:
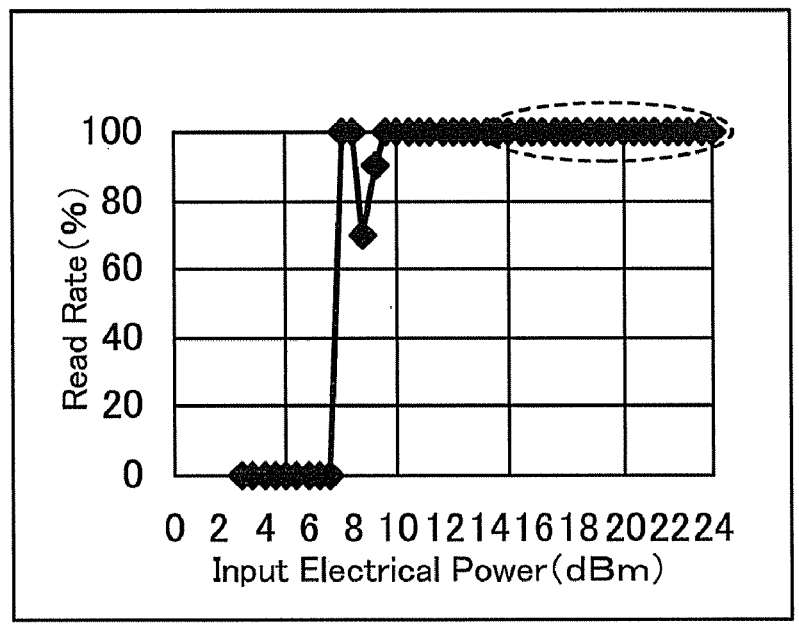
Figure 21A:
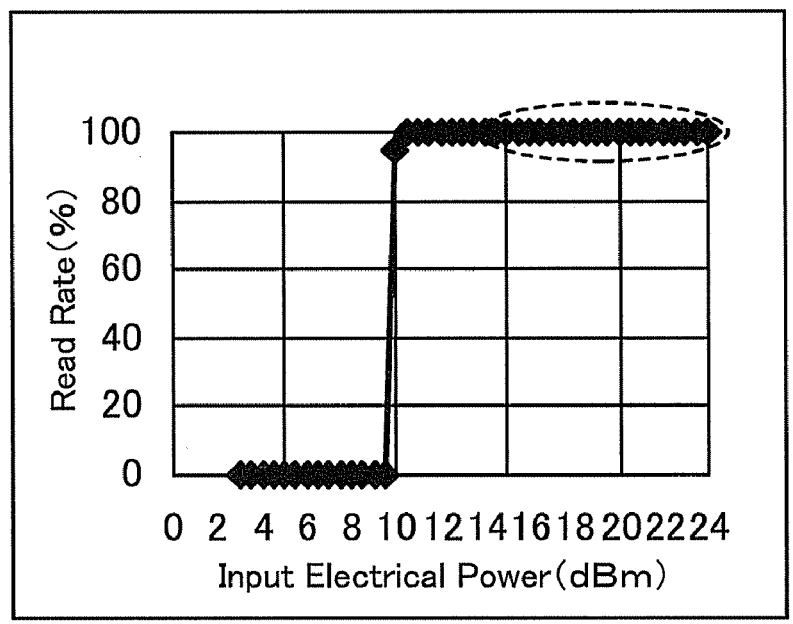
FIGS. 21A and 21B show measurement results (FSK)
Figure 21B:
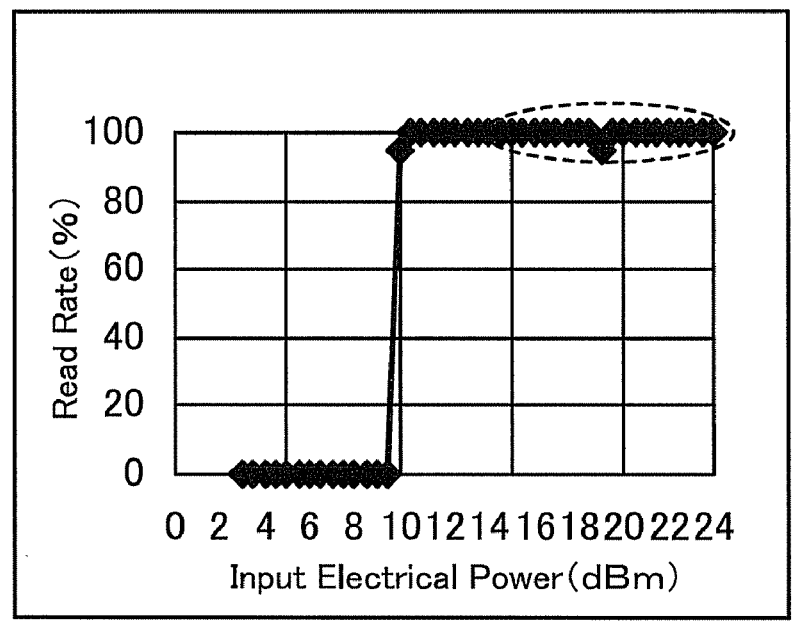

FIGS. 20A and 20B are graphs where the measurement is performed by amplitude shift keying (ASK) for the modulation, and FIGS. 21A and 21B are graphs where the measurement is performed by frequency shift keying (FSK) for the modulation. FIGS. 20A and 21A are the ones in the case where the modulation index is 10% and FIGS. 20B and 21B are the ones in the case where the modulation index is 100%. This evaluation method was in accordance with ISO 15693.

In FIGS. 20A and 20B and FIGS. 21A and 21B, the vertical axis indicates a read rate (%) and the horizontal axis indicates an input electrical power (dBm).

The input electrical power (dBm) increases as the distance between a semiconductor device and a reader/writer decreases.

For example, 5 dBm was measured at a distance of about 30 mm between the semiconductor device and the reader/writer, 10 dBm was measured at a distance of about 20 mm between the semiconductor device and the reader/writer, and 15 dBm was measured at a distance of about 10 mm between the semiconductor device and the reader/writer.

As shown by a broken line in each of FIGS. 20A and 20B and FIGS. 21A and 21B, data was able to be read at high electric power (near an antenna of the reader/writer) in Sample 6.

Accordingly, NAKANUKE failure did not occur in this sample.

(Sample 7)

First, a sample having the same structure as Comparison Sample was prepared (FIGS. 1A and 1B and FIG. 10).

Then, as shown in FIG. 22, a part of the conductive layer in the control portion 2002 was selectively removed by laser ablation as shown by a broken line. The removal of the conductive layer was performed only on the circuit side.

Figure 23A:
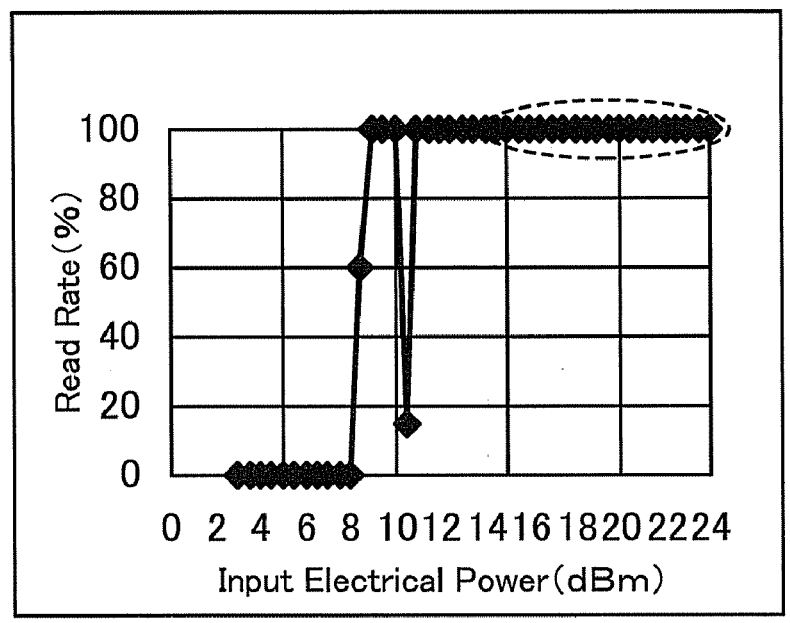
FIGS. 23A and 23B show measurement results (ASK)
Figure 23B:
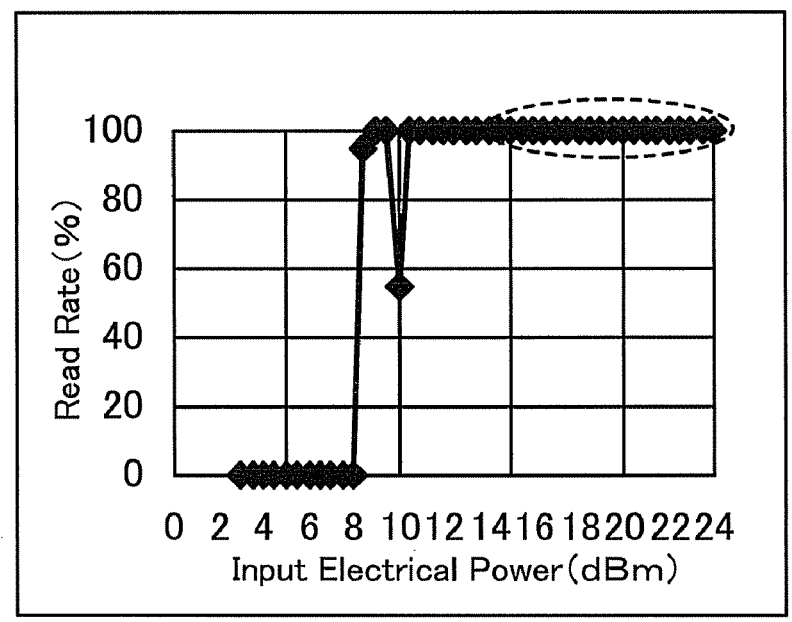
Figure 24A:
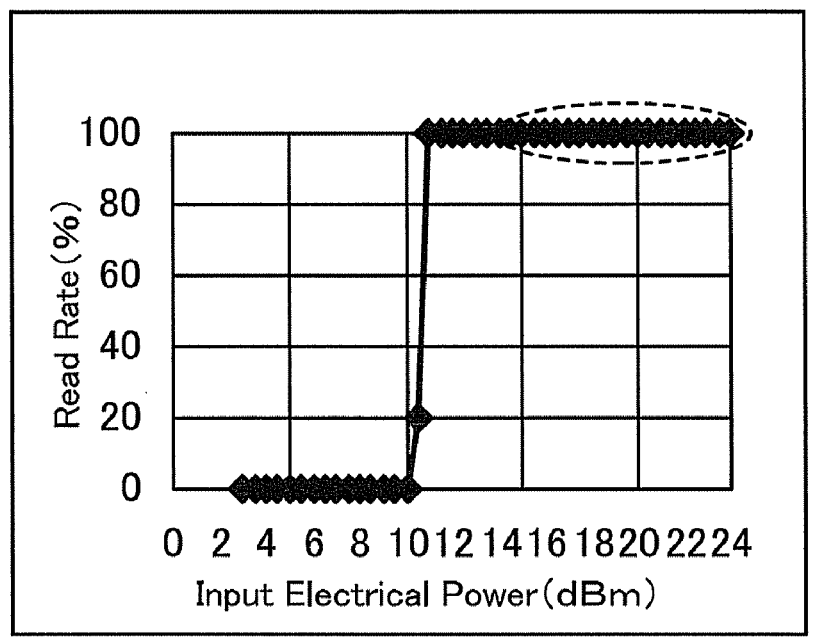
FIGS. 24A and 24B show measurement results (FSK)
Figure 24B:
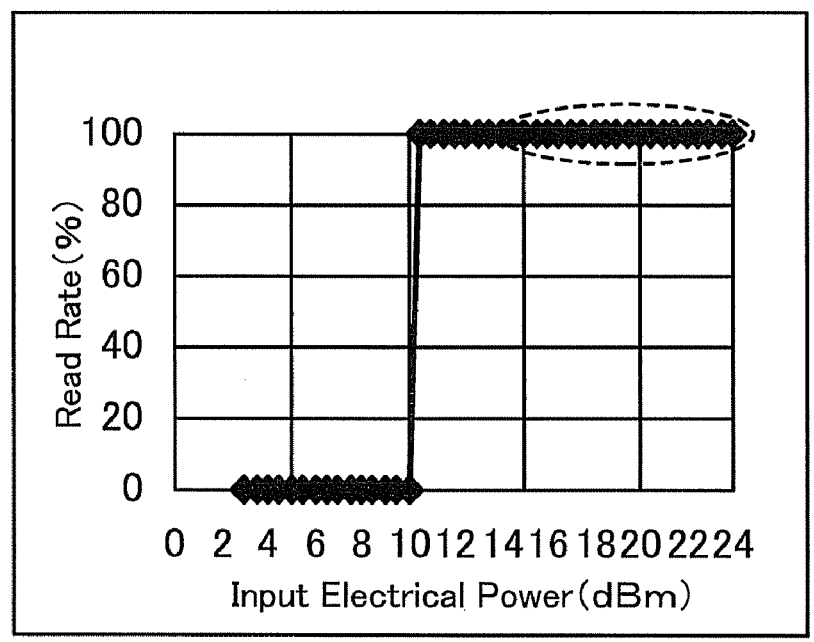

FIGS. 23A and 23B are graphs where the measurement is performed by amplitude shift keying (ASK) for the modulation, and FIGS. 24A and 24B are graphs where the measurement is performed by frequency shift keying (FSK) for the modulation. FIGS. 23A and 24A are the ones in the case where the modulation index is 10% and FIGS. 23B and 24B are the ones in the case where the modulation index is 100%. This evaluation method was in accordance with ISO 15693.

In FIGS. 23A and 23B and FIGS. 24A and 24B, the vertical axis indicates a read rate (%) and the horizontal axis indicates an input electrical power (dBm).

The input electrical power (dBm) increases as the distance between a semiconductor device and a reader/writer decreases.

For example, 5 dBm was measured at a distance of about 30 mm between the semiconductor device and the reader/writer, 10 dBm was measured at a distance of about 20 mm between the semiconductor device and the reader/writer, and 15 dBm was measured at a distance of about 10 mm between the semiconductor device and the reader/writer.

As shown by a broken line in each of FIGS. 23A and 23B and FIGS. 24A and 24B, data was able to be read at high electric power (near an antenna of the reader/writer) in Sample 7.

Accordingly, NAKANUKE failure did not occur in this sample.

(Summary)

Occurrence of NAKANUKE failure was prevented in Samples 4, 6, and 7 in each of which the conductive layer at a position which overlaps the control portion 2002 was removed.

This application is based on Japanese Patent Application serial no. 2009-215537 filed with Japan Patent Office on Sep. 17, 2009, the entire contents of which are hereby incorporated by reference.

What is claimed is:

1. A semiconductor device comprising:
   a pair of conductive layers;
   a pair of insulators provided between the pair of conductive layers; and
   a chip which is provided between the pair of insulators and comprises an antenna, an analog circuit, and a digital circuit,
   wherein an opening is provided for at least one of the pair of conductive layers, and
   wherein the opening is provided at a position which overlaps the analog circuit.

2. The semiconductor device according to claim 1, wherein the position further overlaps the digital circuit.

3. The semiconductor device according to claim 1, wherein the position further overlaps the antenna and the digital circuit.

4. The semiconductor device according to claim 1, wherein the pair of conductive layers be electrically connected to each other.

5. A semiconductor device comprising:
   a pair of insulators;
   a pair of conductive layers provided between the pair of insulators; and
   a chip which is provided between the pair of conductive layers and comprises an antenna, an analog circuit, and a digital circuit,
   wherein an opening is provided for at least one of the pair of conductive layers, and
   wherein the opening is provided at a position which overlaps the analog circuit.

6. The semiconductor device according to claim 5, wherein the position further overlaps the digital circuit.

7. The semiconductor device according to claim 5, wherein the position further overlaps the antenna and the digital circuit.

8. The semiconductor device according to claim 5, wherein the pair of conductive layers be electrically connected to each other.

9. A semiconductor device comprising:
   a pair of conductive layers;
   a pair of insulators provided between the pair of conductive layers; and
   a chip which is provided between the pair of insulators and comprises an antenna, an analog circuit, and a digital circuit,
   wherein the analog circuit comprises at least a regulator circuit,
   wherein an opening is provided for at least one of the pair of conductive layers, and
   wherein the opening is provided at a position which overlaps the regulator circuit.

10. The semiconductor device according to claim 9, wherein the pair of conductive layers be electrically connected to each other.

11. A semiconductor device comprising:
    a pair of insulators;
    a pair of conductive layers provided between the pair of insulators; and
    a chip which is provided between the pair of conductive layers and comprises an antenna, an analog circuit, and a digital circuit,
    wherein the analog circuit comprises at least a regulator circuit,
    wherein an opening is provided for at least one of the pair of conductive layers, and
    wherein the opening is provided at a position which overlaps the regulator circuit.

12. The semiconductor device according to claim 11, wherein the pair of conductive layers be electrically connected to each other.

* * * * *